(12) United States Patent
Chen et al.

(10) Patent No.: US 12,495,070 B2
(45) Date of Patent: *Dec. 9, 2025

(54) MOBILE COMMUNICATION METHOD, APPARATUS, AND DEVICE

(71) Applicant: HUAWEI TECHNOLOGIES CO., LTD., Guangdong (CN)

(72) Inventors: Jing Chen, Shenzhen (CN); Qi Li, Shenzhen (CN); Lin Shu, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,898

(22) Filed: May 20, 2024

(65) Prior Publication Data

US 2024/0396934 A1 Nov. 28, 2024

Related U.S. Application Data

(63) Continuation of application No. 18/355,671, filed on Jul. 20, 2023, now Pat. No. 12,003,533, which is a
(Continued)

(51) Int. Cl.
*H04L 9/40* (2022.01)
*H04L 9/32* (2006.01)
(Continued)

(52) U.S. Cl.
CPC ........ *H04L 63/1466* (2013.01); *H04L 9/3242* (2013.01); *H04L 63/20* (2013.01);
(Continued)

(58) Field of Classification Search
CPC ..... H04W 12/06; H04W 12/02; H04W 12/10; H04W 12/0433; H04W 12/03;
(Continued)

(56) References Cited

U.S. PATENT DOCUMENTS 10,412,579 B2 * 9/2019 Zhang ............... H04W 12/0471
10,419,938 B2 * 9/2019 Chen ................... H04W 12/125
(Continued)

FOREIGN PATENT DOCUMENTS

CN 101011330 8/2007
CN 101242629 8/2008
(Continued)

OTHER PUBLICATIONS

3GPP TS 24.301 V13.4.0 (Dec. 2015), "3rd Generation Partnership Project; Technical Specification Group Core Network and Terminals; Non-Access-Stratum (NAS) protocol for Evolved Packet System (EPS); Stage 3 (Release 13)," Dec. 2015, 401 pages.
(Continued)

*Primary Examiner* — Dung Hong
(74) *Attorney, Agent, or Firm* — Fish & Richardson P.C.

(57) ABSTRACT

The present disclosure relates to mobile communications technologies, and in particular, to a mobile communication method, apparatus, and device. The method includes: receiving, by user equipment UE, a non-access stratum NAS security mode command message from a mobility management entity MME, where the NAS security mode command message carries first verification matching information used to verify UE capability information received by the MME; determining, by the UE based on the first verification matching information, whether the UE capability information received by the MME is consistent with UE capability information sent by the UE to the MME; and if the UE capability information received by the MME is consistent with the UE capability information sent by the UE to the MME, sending, by the UE, a NAS security mode complete message to the MME.

20 Claims, 15 Drawing Sheets

```
┌─────────────────────────────────────────────────────────┐
│  UE receives a NAS security mode command message         │   S11
│  from an MME, where the NAS security mode command        │
│  message carries first verification matching information │
└─────────────────────────────────────────────────────────┘
                            │
                            ▼
┌─────────────────────────────────────────────────────────┐
│  The UE determines, based on the first verification      │   S12
│  matching information, whether UE capability information │
│  received by the MME is consistent with UE capability    │
│  information sent by the UE to the MME                   │
└─────────────────────────────────────────────────────────┘
                            │
                            ▼
┌─────────────────────────────────────────────────────────┐
│  If the UE capability information received by the MME    │   S13
│  is consistent with the UE capability information sent   │
│  by the UE to the MME, the UE sends a NAS security       │
│  mode complete message to the MME                        │
└─────────────────────────────────────────────────────────┘
```

Related U.S. Application Data continuation of application No. 17/723,257, filed on Apr. 18, 2022, now Pat. No. 11,736,519, which is a continuation of application No. 17/138,498, filed on Dec. 30, 2020, now Pat. No. 11,310,266, which is a continuation of application No. 16/552,530, filed on Aug. 27, 2019, now Pat. No. 10,944,786, which is a continuation of application No. 16/026,777, filed on Jul. 3, 2018, now Pat. No. 10,419,938, which is a continuation of application No. PCT/CN2016/070182, filed on Jan. 5, 2016.

(51) Int. Cl.
| | | |
|---|---|---|
| *H04W 8/24* | (2009.01) | |
| *H04W 12/04* | (2021.01) | |
| *H04W 12/06* | (2021.01) | |
| *H04W 12/08* | (2021.01) | |
| *H04W 12/106* | (2021.01) | |
| *H04W 12/125* | (2021.01) | |

(52) U.S. Cl.
CPC ............ *H04W 8/24* (2013.01); *H04W 12/04* (2013.01); *H04W 12/06* (2013.01); *H04W 12/08* (2013.01); *H04W 12/106* (2021.01); *H04W 12/125* (2021.01)

(58) Field of Classification Search
CPC ... H04W 24/10; H04W 12/08; H04W 12/037; H04W 12/106; H04W 12/125; H04W 8/24; H04W 12/04; H04L 63/1466; H04L 9/3242; H04L 63/20
See application file for complete search history.

(56) References Cited

U.S. PATENT DOCUMENTS

| | | | |
|---|---|---|---|
| 10,944,786 B2 | 3/2021 | Chen et al. | |
| 11,310,266 B2 | 4/2022 | Chen et al. | |
| 12,003,533 B2 * | 6/2024 | Chen .................. | H04W 12/04 |
| 2006/0229095 A1 | 10/2006 | Sung et al. | |
| 2009/0170426 A1 * | 7/2009 | Jung ..................... | H04W 8/24 455/7 |
| 2009/0238099 A1 | 9/2009 | Ahmavaara | |
| 2009/0298471 A1 * | 12/2009 | He ...................... | H04W 12/108 455/411 |
| 2009/0305671 A1 * | 12/2009 | Luft ..................... | H04W 36/04 455/411 |
| 2010/0095123 A1 * | 4/2010 | He ....................... | H04L 9/0844 713/171 |
| 2010/0115275 A1 * | 5/2010 | Suh ...................... | H04W 12/08 713/168 |
| 2011/0038480 A1 * | 2/2011 | Lin ..................... | H04W 12/0431 380/278 |
| 2011/0072488 A1 | 3/2011 | Bi | |
| 2012/0047367 A1 * | 2/2012 | Han ..................... | H04L 63/205 713/171 |
| 2013/0102270 A1 * | 4/2013 | Suh ..................... | H04W 76/50 455/404.1 |
| 2014/0120879 A1 | 5/2014 | He | |
| 2014/0241317 A1 | 8/2014 | Swamy et al. | |
| 2015/0134969 A1 | 5/2015 | Kim et al. | |
| 2015/0334560 A1 * | 11/2015 | Zhang ............... | H04W 12/0433 380/284 |
| 2015/0382253 A1 * | 12/2015 | Suh ................... | H04W 36/0016 455/411 |
| 2016/0073265 A1 * | 3/2016 | Vutukuri .............. | H04W 16/14 455/411 |
| 2016/0227410 A1 * | 8/2016 | Narasimha ............ | H04W 12/04 |
| 2016/0262021 A1 * | 9/2016 | Lee ..................... | H04W 12/062 |
| 2017/0006469 A1 * | 1/2017 | Palanigounder ...... | H04L 9/0841 |
| 2017/0150363 A1 * | 5/2017 | Tenny .................. | H04L 63/102 |
| 2018/0041901 A1 * | 2/2018 | Yilmaz ................ | H04W 74/08 |
| 2018/0184297 A1 * | 6/2018 | Mohamed ............. | H04W 12/08 |

FOREIGN PATENT DOCUMENTS

| | | |
|---|---|---|
| CN | 101378591 | 3/2009 |
| CN | 101384079 | 3/2009 |
| CN | 101686233 | 3/2010 |
| CN | 101686463 A | 3/2010 |
| CN | 101790168 | 7/2010 |
| CN | 101835156 | 9/2010 |
| CN | 101848464 | 9/2010 |
| CN | 102307091 | 1/2012 |
| CN | 102624759 | 8/2012 |
| CN | 102905265 | 1/2013 |
| CN | 102917332 | 2/2013 |
| CN | 104427584 | 3/2015 |
| CN | 104488303 | 4/2015 |
| CN | 104967984 | 10/2015 |
| EP | 2139175 | 12/2009 |
| EP | 2521387 | 11/2012 |
| KR | 20100054178 | 5/2010 |
| RU | 2367115 | 10/2006 |
| RU | 2481730 | 9/2009 |
| WO | 2012100749 A1 | 8/2012 |

OTHER PUBLICATIONS

3GPP TS 33.401 V13.1.0 (Dec. 2015), "3rd Generation Partnership Project; Technical Specification Group Services and System Aspects; 3GPP System Architecture Evolution (SAE); Security architecture (Release 13)," Dec. 2015, 135 pages.

3GPP TS 33.401 V8.0.0 (Jun. 2008), "3rd Generation Partnership Project; Technical Specification Group Services and System Aspects; 3GPP System Architecture Evolution (SAE): Security architecture; (Release 8)," Jun. 2008, 45 pages.

3GPP TS 36.355 V12.5.0, "3rd Generation Partnership Project; Technical Specification Group Radio Access Network; Evolved Universal Terrestrial Radio Access (E-UTRA); LTE Positioning Protocol (LPP) (Release 12)," Dec. 2015, 126 pages.

Anand R. Prasad, "Securing the Next Generation: LTE Security," NEC Corporation, dated May 27, 2010, 31 pages.

Extended European Search Report issued in European Application No. 16882868.9 on Nov. 21, 2018, 8 pages.

Extended European Search Report issued in European Application No. 21163083.5 on Jul. 21, 2021, 9 pages.

International Search Report issued in International Application No. PCT/CN2016/070182 on Sep. 22, 2016, 17 pages.

Netmanias, "LTE Security II: NAS and AS Security" (Year: 2013).

NMC Consulting Group, "LTE Security II: NAS and AS Security," Netmanias Technical Document, Oct. 14, 2011, 19 pages.

Notice of Rejection issued in Japanese Application No. 2018-553275 on May 27, 2019, 8 pages.

Office Action issued in Chinese Application No. 201680077927.2 on Dec. 11, 2020, 4 pages.

Office Action issued in Chinese Application No. 201680077927.2 on Feb. 3, 2020, 62 pages (with English translation).

Office Action issued in Chinese Application No. 201910127640.1 on Oct. 11, 2019, 12 pages.

Office Action issued in Chinese Application No. 202110217137.2 on Nov. 18, 2021, 9 pages.

Office Action issued in Chinese Application No. 202110217266.1 on Feb. 16, 2022, 4 pages.

Office Action issued in Chinese Application No. 202110217266.1 on Nov. 18, 2021, 9 pages.

Office Action issued in Korean Application No. 2018-7022094 on Jan. 10, 2020, 6 pages (with English translation).

Russian Office Action issued in Russian Application No. 2018128207 on May 6, 2019, 7 pages (with English translation).

ZTE Corporation, "Mechanisms of limit EIA0 usage for emergency call purpose only," 3GPP TSG-SA3 (Security), Meeting SA3#55, Shanghai, China, May 11-15, 2009, 4 pages.

Nokia Corporation et al., "Correction of handover procedure from E-UTRAN to UTRAN," 3GPP TSG-SA WG3 Meeting #53, S3-082495, Kyoto, Japan, Sep. 2008, 2 pages.

(56) References Cited

OTHER PUBLICATIONS

Huawei, "Security Algorithm Selection solution," 3GPP TSG SA WG3 (Security) Meeting #47, S3-070364, Tallin, Estonia, May 22-25, 2007, 9 pages.

* cited by examiner

MOBILE COMMUNICATION METHOD, APPARATUS, AND DEVICE

CROSS-REFERENCE TO RELATED APPLICATIONS

This application is a continuation of U.S. patent application Ser. No. 18/355,671, filed on Jul. 20, 2023, which is a continuation of U.S. patent application Ser. No. 17/723,257, filed on Apr. 18, 2022, now U.S. Pat. No. 11,736,519, which is a continuation of U.S. patent application Ser. No. 17/138,498, filed on Dec. 30, 2020, now U.S. Pat. No. 11,310,266, which is a continuation of U.S. patent application Ser. No. 16/552,530, filed on Aug. 27, 2019, now U.S. Pat. No. 10,944,786, which is a continuation of U.S. patent application Ser. No. 16/026,777, filed on Jul. 3, 2018, now U.S. Pat. No. 10,419,938, which is a continuation of International Application No. PCT/CN2016/070182, filed on Jan. 5, 2016. All of the afore-mentioned patent applications are hereby incorporated by reference in their entireties.

TECHNICAL FIELD

The present disclosure relates to mobile communications technologies, and in particular, to a mobile communication method, apparatus, and device.

BACKGROUND

In an attach procedure of mobile communications, user equipment (UE) sends an attach request message to a mobility management entity (MME) by using an evolved NodeB (eNB). The attach request message carries UE capability information such as a network capability and a security capability. The MME provides a service for the UE according to the received UE capability. When the attach request message has no integrity protection, for example, the attach request message has no integrity protection in a scenario in which the UE registers with a network for the first time, if an attacker implements a man-in-the-middle attack, to modify the UE capability information sent by the UE to the MME, the MME provides a service for the UE based on the modified UE capability information. Consequently, the UE possibly cannot use some services. For example, the attacker removes voice domain preference and UE's usage setting in the UE capability information, and adds an additional update type-SMS only parameter. As a result, the UE can use only an SMS message service, and cannot use a voice call service.

SUMMARY

Embodiments of the present disclosure provide a mobile communication method, apparatus, and device, to ensure that an MME obtains correct UE capability information.

According to a first aspect, an embodiment of the present disclosure provides a mobile communication method, including:
receiving, by user equipment UE, a non-access stratum NAS security mode command message from a mobility management entity MME, where the NAS security mode command message carries first verification matching information used to verify UE capability information received by the MME;
determining, by the UE based on the first verification matching information, whether the UE capability information received by the MME is consistent with UE capability information sent by the UE to the MME; and
if the UE capability information received by the MME is consistent with the UE capability information sent by the UE to the MME, sending, by the UE, a NAS security mode complete message to the MME.

Optionally, the first verification matching information is a first hash value of an attach request message that is received by the MME before the MME sends the NAS security mode command message to the UE, and the NAS security mode command message further includes a Hash algorithm used by the MME to perform Hash calculation on the received attach request message, an integrity algorithm used by the MME, a key identifier, and a first non-access stratum message authentication code NAS-MAC of the NAS security mode command message;
the UE calculates a second NAS-MAC of the NAS security mode command message received by the UE;
the UE determines whether the second NAS-MAC is consistent with the first NAS-MAC;
if the second NAS-MAC is consistent with the first NAS-MAC, the UE calculates, according to the Hash algorithm, a second hash value of the attach request message sent by the UE to the MME;
the UE determines whether the second hash value is consistent with the first hash value; and
if the second hash value is consistent with the first hash value, the UE sends the NAS security mode complete message to the MME.

Optionally, the NAS security mode command message further includes a UE security capability sent back by the MME;
the UE determines whether the UE security capability sent back by the MME is consistent with a UE security capability sent by the UE to the MME; and
correspondingly, if the UE security capability sent back by the MME is consistent with the UE security capability sent by the UE to the MME, the sending, by the UE, a NAS security mode complete message to the MME includes:
if the second hash value is consistent with the first hash value, the second NAS-MAC is consistent with the first NAS-MAC, and the UE security capability sent back by the MME is consistent with the UE security capability sent by the UE to the MME, sending, by the UE, the NAS security mode complete message to the MME.

Optionally, the method further includes:
if at least one of the second hash value, the second NAS-MAC, and the UE security capability sent back by the MME is verified unsuccessfully, sending, by the UE, a NAS security mode reject message to the MME; or
if the second NAS-MAC is consistent with the first NAS-MAC, the UE security capability sent back by the MME is consistent with the UE security capability sent by the UE to the MME, and the second hash value is inconsistent with the first hash value, sending, by the UE, the NAS security mode complete message to the MME, where the NAS security mode complete message carries the attach request message.

Optionally, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message;

the UE calculates a fourth NAS-MAC of the NAS security mode command message received by the UE; and the UE determines whether the fourth NAS-MAC is consistent with the third NAS-MAC;

if the fourth NAS-MAC is consistent with the third NAS-MAC, the UE calculates, according to the Hash algorithm, a fourth hash value of the UE capability information sent by the UE to the MME;

the UE determines whether the fourth hash value is consistent with the third hash value; and if the fourth hash value is consistent with the third hash value, the UE sends the NAS security mode complete message to the MME.

Optionally, the NAS security mode command message further includes a UE security capability sent back by the MME;

the UE determines whether the UE security capability sent back by the MME is consistent with a UE security capability sent by the UE to the MME; and correspondingly, if the UE security capability sent back by the MME is consistent with the UE security capability sent by the UE to the MME, the sending, by the UE, a NAS security mode complete message to the MME includes:

if the fourth hash value is consistent with the third hash value, the fourth NAS-MAC is consistent with the third NAS-MAC, and the UE security capability sent back by the MME is consistent with the UE security capability sent by the UE to the MME, sending, by the UE, the NAS security mode complete message to the MME.

Optionally, the method further includes:

if at least one of the fourth hash value, the fourth NAS-MAC, and the UE security capability sent back by the MME is verified unsuccessfully, sending, by the UE, a NAS security mode reject message to the MME; or if the fourth NAS-MAC is consistent with the third NAS-MAC, the UE security capability sent back by the MME is consistent with the UE security capability sent by the UE to the MME, and the fourth hash value is inconsistent with the third hash value, sending, by the UE, the NAS security mode complete message to the MME, where the NAS security mode complete message carries the UE capability information.

Optionally, the first verification matching information is the UE capability information received by the MME, and the NAS security mode command message further includes an integrity algorithm used by the MME, a key identifier, and a fifth NAS-MAC of the NAS security mode command message;

the UE calculates a sixth NAS-MAC of the NAS security mode command message received by the UE;

the UE determines whether the sixth NAS-MAC is consistent with the fifth NAS-MAC;

if the sixth NAS-MAC is consistent with the fifth NAS-MAC, the UE determines whether the UE capability information received by the MME is consistent with the UE capability information sent by the UE to the MME; and if the UE capability information received by the MME is consistent with the UE capability information sent by the UE to the MME, the UE sends the NAS security mode complete message to the MME.

Optionally, the UE determines whether the sixth NAS-MAC is consistent with the fifth NAS-MAC;

if the sixth NAS-MAC is consistent with the fifth NAS-MAC, the UE determines whether a UE security capability included in the UE capability information received by the MME is consistent with a UE security capability sent by the UE to the MME;

if the UE security capability included in the UE capability information received by the MME is consistent with the UE security capability sent by the UE to the MME, the UE determines whether capabilities other than the UE security capability in the UE capability information received by the MME are consistent with capabilities sent by the UE to the MME; and if the capabilities other than the UE security capability in the UE capability information received by the MME are consistent with the capabilities sent by the UE to the MME, the UE sends the NAS security mode complete message to the MME.

Optionally, the method further includes:

if the capabilities other than the UE security capability in the UE capability information received by the MME are inconsistent with the capabilities sent by the UE to the MME, sending, by the UE, the NAS security mode complete message to the MME, where the NAS security mode complete message carries the UE capability information.

Optionally, the NAS security mode command message includes: a UE security capability received by the MME, an integrity algorithm used by the MME, a key identifier, and a seventh NAS-MAC of the NAS security mode command message;

the UE calculates an eighth NAS-MAC of the NAS security mode command message received by the UE;

the UE determines whether the eighth NAS-MAC is consistent with the seventh NAS-MAC;

if the eighth NAS-MAC is consistent with the seventh NAS-MAC, the UE determines whether the UE security capability received by the MME is consistent with a UE security capability sent by the UE to the MME; and if the UE security capability received by the MME is consistent with the UE security capability sent by the UE to the MME, the UE sends the NAS security mode complete message to the MME, where the NAS security mode complete message carries second verification matching information and a NAS-MAC of the NAS security mode complete message.

Optionally, the second verification matching information includes:

a hash value of an attach request message sent by the UE to the MME; or a hash value of the UE capability information sent by the UE to the MME.

Optionally, the second verification matching information includes the UE capability information of the UE.

Optionally, after the sending, by the UE, a NAS security mode complete message to the MME, the method further includes:

receiving, by the UE, a downlink NAS transport message sent by the MME, where the downlink NAS transport message carries a UE capability information request message or a request message for requesting the UE to resend the attach request message; and sending, by the UE, an uplink information transfer message to the MME, where the uplink information transfer message carries the UE capability information or the attach request message.

Optionally, after the sending, by the UE, a NAS security mode complete message to the MME, the method further includes:
  receiving, by the UE, a UE information request message sent by the MME, where the UE information request message carries a UE capability information request message or a request message for requesting the UE to resend the attach request message; and
  the UE sends a UE information response message to the MME, where the UE information response message carries the UE capability information or the attach request message.

According to a second aspect, an embodiment of the present disclosure provides a mobile communication method, including:
  sending, by an MME, a NAS security mode command message to UE, where the NAS security mode command message carries first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

Optionally, the first verification matching information is a first hash value of an attach request message received by the MME, and the NAS security mode command message further includes a Hash algorithm used by the MME to perform Hash calculation on the received attach request message, an integrity algorithm used by the MME, a key identifier, and a first non-access stratum message authentication NAS-MAC of the NAS security mode command message.

Optionally, the NAS security mode command message further includes a UE security capability received by the MME.

Optionally, the method further includes:
  when a second NAS-MAC of the NAS security mode command message generated by the UE is consistent with the first NAS-MAC, a UE security capability sent back by the MME is consistent with a UE security capability sent by the UE to the MME, and a second hash value of the attach request message generated by the UE is inconsistent with the first hash value, receiving, by the MME, the NAS security mode complete message sent by the UE, where the NAS security mode complete message carries the attach request message.

Optionally, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message.

Optionally, the NAS security mode command message further includes a UE security capability received by the MME.

Optionally, the method further includes:
  when a fourth NAS-MAC of the NAS security mode command message generated by the UE is consistent with the third NAS-MAC, a UE security capability sent back by the MME is consistent with a UE security capability sent by the UE to the MME, and a fourth hash value of the UE capability information generated by the UE is inconsistent with the third hash value, receiving, by the MME, the NAS security mode complete message sent by the UE, where the NAS security mode complete message carries the UE capability information.

Optionally, the first verification matching information is the UE capability information received by the MME, and the NAS security mode command message further includes an integrity algorithm used by the MME, a key identifier, and a fifth NAS-MAC of the NAS security mode command message.

Optionally, the method further includes:
  when a sixth NAS-MAC of the NAS security mode command message generated by the UE is consistent with the fifth NAS-MAC, a UE security capability included in the UE capability information sent back by the MME is consistent with a UE security capability sent by the UE to the MME, and the UE determines that capabilities other than the UE security capability in the UE capability information received by the MME are inconsistent with capabilities sent by the UE to the MME, receiving, by the MME, the NAS security mode complete message sent by the UE, where the NAS security mode complete message carries the UE capability information.

Optionally, the NAS security mode command message includes: a UE security capability received by the MME, an integrity algorithm used by the MME, a key identifier, and a seventh NAS-MAC of the NAS security mode command message.

Optionally, the method further includes:
  receiving, by the MME, the NAS security mode complete message sent by the UE, where the NAS security mode complete message carries second verification matching information and a NAS-MAC of the NAS security mode complete message.

Optionally, the second verification matching information includes:
  a hash value of an attach request message sent by the UE to the MME; or
  a hash value of the UE capability information sent by the UE to the MME.

Optionally, the second verification matching information includes the UE capability information of the UE.

Optionally, the method further includes:
  if the MME determines that the UE capability information received by the MME is inconsistent with that sent by the UE, sending, by the MME, a downlink NAS transport message to the UE, where the downlink NAS transport message carries a UE capability information request message or a request message for requesting the UE to resend the attach request message; and
  receiving, by the MME, an uplink information transfer message sent by the UE, where the uplink information transfer message carries the UE capability information or the attach request message.

Optionally, the method further includes:
  if the MME determines that the UE capability information received by the MME is inconsistent with that sent by the UE, sending, by the MME, a UE information request message to the UE, where the UE information request message carries a UE capability information request message or a request message for requesting the UE to resend the attach request message; and receiving, by the MME, a UE information response message sent by the UE, where the UE information response message carries the UE capability information or the attach request message.

According to a third aspect, an embodiment of the present disclosure provides a mobile communications apparatus. The apparatus is deployed in UE and includes:

a receiving module, configured to receive a non-access stratum NAS security mode command message from a mobility management entity MME, where the NAS security mode command message carries first verification matching information used to verify UE capability information received by the MME;

a verification module, configured to determine, based on the first verification matching information, whether the UE capability information received by the MME is consistent with UE capability information sent by the UE to the MME; and a first sending module, configured to: when the UE capability information received by the MME is consistent with the UE capability information sent by the UE to the MME, send a NAS security mode complete message to the MME.

Optionally, the first verification matching information is a first hash value of an attach request message that is received by the MME before the MME sends the NAS security mode command message to the UE, and the NAS security mode command message further includes a Hash algorithm used by the MME to perform Hash calculation on the received attach request message, an integrity algorithm used by the MME, a key identifier, and a first non-access stratum message authentication code NAS-MAC of the NAS security mode command message;

the verification module is configured to:
calculate a second NAS-MAC of the NAS security mode command message received by the UE;
determine whether the second NAS-MAC is consistent with the first NAS-MAC;
if the second NAS-MAC is consistent with the first NAS-MAC, calculate, according to the Hash algorithm, a second hash value of the attach request message sent by the UE to the MME; and
determine whether the second hash value is consistent with the first hash value; and
the first sending module is configured to: when the second hash value is consistent with the first hash value and the second NAS-MAC is consistent with the first NAS-MAC, send the NAS security mode complete message to the MME.

Optionally, the NAS security mode command message further includes a UE security capability sent back by the MME;
the verification module is further configured to:
determine whether the UE security capability sent back by the MME is consistent with a UE security capability sent by the UE to the MME; and
the first sending module is configured to:
if the second hash value is consistent with the first hash value, the second NAS-MAC is consistent with the first NAS-MAC, and the UE security capability sent back by the MME is consistent with the UE security capability sent by the UE to the MME, send the NAS security mode complete message to the MME.

Optionally, the first sending module is further configured to:
if at least one of the second hash value, the second NAS-MAC, and the UE security capability sent back by the MME is verified unsuccessfully, send a NAS security mode reject message to the MME; or further configured to: if the second NAS-MAC is consistent with the first NAS-MAC, the UE security capability sent back by the MME is consistent with the UE security capability sent by the UE to the MME, and the second hash value is inconsistent with the first hash value, send the NAS security mode complete message to the MME, where the NAS security mode complete message carries the attach request message.

Optionally, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message;

the verification module is configured to:
calculate a fourth NAS-MAC of the NAS security mode command message received by the UE;
determine whether the fourth NAS-MAC is consistent with the third NAS-MAC;
if the fourth NAS-MAC is consistent with the third NAS-MAC, calculate, according to the Hash algorithm, a fourth hash value of the UE capability information sent by the UE to the MME; and
determine whether the fourth hash value is consistent with the third hash value; and
the first sending module is configured to: if the fourth hash value is consistent with the third hash value, send, for the UE, the NAS security mode complete message to the MME.

Optionally, the NAS security mode command message further includes a UE security capability sent back by the MME;
the verification module is further configured to:
determine whether the UE security capability sent back by the MME is consistent with a UE security capability sent by the UE to the MME; and
the first sending module is configured to:
if the fourth hash value is consistent with the third hash value, the fourth NAS-MAC is consistent with the third NAS-MAC, and the UE security capability sent back by the MME is consistent with the UE security capability sent by the UE to the MME, send the NAS security mode complete message to the MME.

Optionally, the first sending module is further configured to:
if at least one of the fourth hash value, the fourth NAS-MAC, and the UE security capability sent back by the MME is verified unsuccessfully, send, for the UE, a NAS security mode reject message to the MME; or
the first sending module is further configured to: if the fourth NAS-MAC is consistent with the third NAS-MAC, the UE security capability sent back by the MME is consistent with the UE security capability sent by the UE to the MME, and the fourth hash value is inconsistent with the third hash value, send, for the UE, the NAS security mode complete message to the MME, where the NAS security mode complete message carries the UE capability information.

Optionally, the first verification matching information is the UE capability information received by the MME, and the NAS security mode command message further includes an integrity algorithm used by the MME, a key identifier, and a fifth NAS-MAC of the NAS security mode command message;
    the verification module is configured to:
        calculate a sixth NAS-MAC of the NAS security mode command message received by the UE;
        determine, for the UE, whether the sixth NAS-MAC is consistent with the fifth NAS-MAC; and
        determine whether the UE capability information received by the MME is consistent with the UE capability information sent by the UE to the MME; and
    the first sending module is configured to: if the UE capability information received by the MME is consistent with the UE capability information sent by the UE to the MME, send the NAS security mode complete message to the MME.

Optionally, the verification module is configured to:
    determine whether the sixth NAS-MAC is consistent with the fifth NAS-MAC;
    if the sixth NAS-MAC is consistent with the fifth NAS-MAC, determine whether a UE security capability included in the UE capability information received by the MME is consistent with a UE security capability sent by the UE to the MME; and
    if the UE security capability included in the UE capability information received by the MME is consistent with the UE security capability sent by the UE to the MME, determine, for the UE, whether capabilities other than the UE security capability in the UE capability information received by the MME are consistent with capabilities sent by the UE to the MME; and
    the first sending module is configured to: if the capabilities other than the UE security capability in the UE capability information received by the MME are consistent with the capabilities sent by the UE to the MME, send the NAS security mode complete message to the MME.

Optionally, the first sending module is further configured to:
    if the capabilities other than the UE security capability in the UE capability information received by the MME are inconsistent with the capabilities sent by the UE to the MME, send the NAS security mode complete message to the MME, where the NAS security mode complete message carries the UE capability information.

Optionally, the NAS security mode command message includes: a UE security capability received by the MME, an integrity algorithm used by the MME, a key identifier, and a seventh NAS-MAC of the NAS security mode command message;
    the verification module is configured to:
        calculate an eighth NAS-MAC of the NAS security mode command message received by the UE; and
        determine whether the eighth NAS-MAC is consistent with the seventh NAS-MAC; and if the eighth NAS-MAC is consistent with the seventh NAS-MAC, determine whether the UE security capability received by the MME is consistent with a UE security capability sent by the UE to the MME; and
    the first sending module is configured to: if the UE security capability received by the MME is consistent with the UE security capability sent by the UE to the MME, send the NAS security mode complete message to the MME, where the NAS security mode complete message carries second verification matching information and a NAS-MAC of the NAS security mode complete message.

Optionally, the second verification matching information includes:
    a hash value of an attach request message sent by the UE to the MME; or
    a hash value of the UE capability information sent by the UE to the MME.

Optionally, the second verification matching information includes the UE capability information of the UE.

Optionally, the receiving module is further configured to: after the first sending module sends the NAS security mode complete message to the MME, receive a downlink NAS transport message sent by the MME, where the downlink NAS transport message carries a UE capability information request message or a request message for requesting the UE to resend the attach request message; and
    the first sending module is further configured to send an uplink information transfer message to the MME, where the uplink information transfer message carries the UE capability information or the attach request message.

Optionally, the receiving module is further configured to:
    after the first sending module sends the NAS security mode complete message to the MME, receive a UE information request message sent by the MME, where the UE information request message carries a UE capability information request message or a request message for requesting the UE to resend the attach request message; and
    the first sending module is further configured to send a UE information response message to the MME, where the UE information response message carries the UE capability information or the attach request message.

According to a fourth aspect, an embodiment of the present disclosure provides a mobile communications apparatus. The apparatus is deployed in an MME and includes:
    a second sending module, configured to send a NAS security mode command message to UE, where the NAS security mode command message carries first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

Optionally, the first verification matching information is a first hash value of an attach request message received by the MME, and the NAS security mode command message further includes a Hash algorithm used by the MME to perform Hash calculation on the received attach request message, an integrity algorithm used by the MME, a key identifier, and a first non-access stratum message authentication NAS-MAC of the NAS security mode command message.

Optionally, the NAS security mode command message further includes a UE security capability received by the MME.

Optionally, the apparatus further includes a first receiving module, configured to:
    when a second NAS-MAC of the NAS security mode command generated by the UE is consistent with the first NAS-MAC, a UE security capability sent back by the MME is consistent with a UE security capability sent by the UE to the MME, and a second hash value of the attach request message generated by the UE is inconsistent with the first hash value, receive the NAS security mode complete message sent by the UE, where the NAS security mode complete message carries the attach request message.

Optionally, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message.

Optionally, the NAS security mode command message further includes a UE security capability received by the MME.

Optionally, the apparatus further includes a second receiving module, configured to:
  when a fourth NAS-MAC of the NAS security mode command message generated by the UE is consistent with the third NAS-MAC, a UE security capability sent back by the MME is consistent with a UE security capability sent by the UE to the MME, and a fourth hash value of the UE capability information generated by the UE is inconsistent with the third hash value, receive the NAS security mode complete message sent by the UE, where the NAS security mode complete message carries the UE capability information.

Optionally, the first verification matching information is the UE capability information received by the MME, and the NAS security mode command message further includes an integrity algorithm used by the MME, a key identifier, and a fifth NAS-MAC of the NAS security mode command message.

Optionally, the apparatus further includes a third receiving module, configured to:
  when a sixth NAS-MAC of the NAS security mode command message generated by the UE is consistent with the fifth NAS-MAC, a UE security capability included in the UE capability information received by the MME is consistent with a UE security capability sent by the UE to the MME, and the UE determines that capabilities other than the UE security capability in the UE capability information received by the MME are inconsistent with capabilities sent by the UE to the MME, receive the NAS security mode complete message sent by the UE, where the NAS security mode complete message carries the UE capability information.

Optionally, the NAS security mode command message includes: a UE security capability received by the MME, an integrity algorithm used by the MME, a key identifier, and a seventh NAS-MAC of the NAS security mode command message.

Optionally, the apparatus further includes a fourth receiving module, configured to receive the NAS security mode complete message sent by the UE, where the NAS security mode complete message carries second verification matching information and a NAS-MAC of the NAS security mode complete message.

Optionally, the second verification matching information includes:
  a hash value of an attach request message sent by the UE to the MME; or
  a hash value of the UE capability information sent by the UE to the MME.

Optionally, the second verification matching information includes the UE capability information of the UE.

Optionally, the second sending module is further configured to: if the UE capability information received by the MME is inconsistent with that sent by the UE, send a downlink NAS transport message to the UE, where the downlink NAS transport message carries a UE capability information request message or a request message for requesting the UE to resend the attach request message; and
  the fourth receiving module is further configured to receive an uplink information transfer message sent by the UE, where the uplink information transfer message carries the UE capability information or the attach request message.

Optionally, the second sending module is further configured to: if the MME determines that the UE capability information received by the MME is inconsistent with that sent by the UE, send a UE information request message to the UE, where the UE information request message carries a UE capability information request message or a request message for requesting the UE to resend the attach request message; and
  the fourth receiving module is further configured to receive a UE information response message sent by the UE, where the UE information response message carries the UE capability information or the attach request message.

According to a fifth aspect, an embodiment of the present disclosure provides a mobile communications device. The device is deployed in UE and includes:
  a communications interface, a memory, a processor, and a communications bus, where the communications interface, the memory, and the processor communicate by using the communications bus; and
  the memory is configured to store a program, and the processor is configured to execute the program stored in the memory; and when the mobile communications device runs, the processor runs the program, and the program includes:
  receiving a non-access stratum NAS security mode command message from a mobility management entity MME, where the NAS security mode command message carries first verification matching information used to verify UE capability information received by the MME;
  determining, based on the first verification matching information, whether the UE capability information received by the MME is consistent with UE capability information sent by the UE to the MME; and
  if the UE capability information received by the MME is consistent with the UE capability information sent by the UE to the MME, sending a NAS security mode complete message to the MME.

According to a sixth aspect, an embodiment of the present disclosure provides a mobile communications device. The device is deployed in an MME and includes:
  a communications interface, a memory, a processor, and a communications bus, where the communications interface, the memory, and the processor communicate by using the communications bus; and
  the memory is configured to store a program, and the processor is configured to execute the program stored in the memory; and when the mobile communications device runs, the processor runs the program, and the program includes:

sending a NAS security mode command message to UE, where the NAS security mode command message carries first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

According to the method in the embodiments of the present disclosure, the UE verifies, based on the received first verification matching message, whether the UE capability information received by the MME is consistent with the UE capability information sent by the UE to the MME. It can be learned that, in the embodiments of the present disclosure, the MME sends back the verification matching message, and the UE verifies the UE capability information received by the MME, to ensure that the MME possesses correct UE capability information. This resolves a DoS attack problem caused by that in an attach procedure, an attach request message is not protected by a NAS security context, an attacker may modify the UE capability information, and the MME cannot obtain a correct UE capability information. DoS is an abbreviation of Denial of Service, that is, denial of service, and an attack behavior causing the DoS is referred to as a DoS attack.

DESCRIPTION OF EMBODIMENTS

Figure 1:
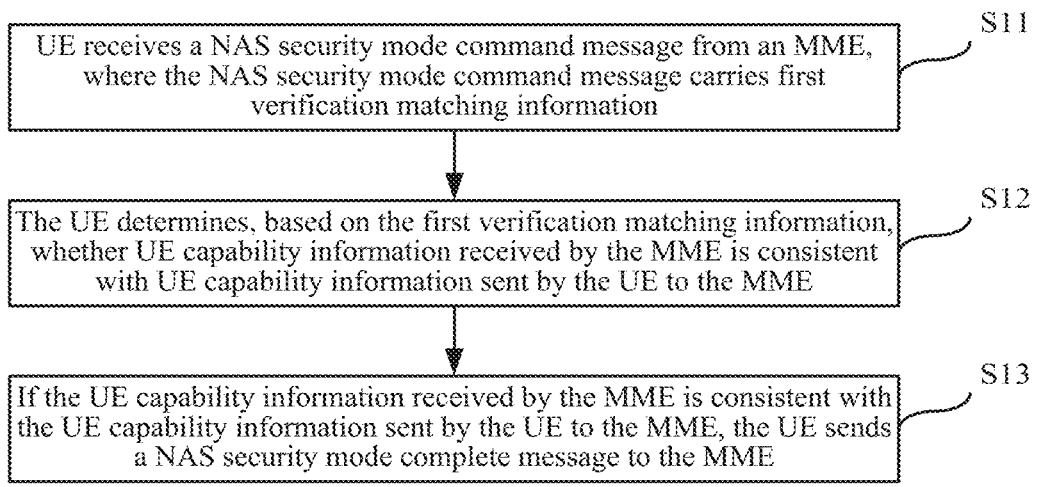
FIG. 1 is a flowchart of a mobile communication method according to Embodiment 1 of the present disclosure.

FIG. 1 is a flowchart of a mobile communication method according to Embodiment 1 of the present disclosure. As shown in FIG. 1, Embodiment 1 of the present disclosure includes the following main processing steps.

Step S11: UE receives a non-access stratum (NAS) security mode command message from an MME, where the NAS security mode command message carries first verification matching information used to verify UE capability information received by the MME.

In an attach procedure of the UE, the UE sends an attach request message to the MME by using an eNB, where the attach request message carries the UE capability information.

The UE capability information includes: a UE network capability, where the UE network capability includes a UE security capability, a mobile station (MS) network capability, a mobile station classmark 2, a mobile station classmark 3, supported codecs, an additional update type, voice domain preference and UE's usage setting, and mobile station network feature support.

Because the attach request message sent by the UE to the MME may have no integrity protection, the attach request message may be subject to a man-in-the-middle attack. Consequently, the UE capability information in the attach request message received by the MME is inconsistent with that sent by the UE to the MME. As a result, the MME cannot obtain correct UE capability information.

To ensure that the MME can obtain correct UE capability information, the MME sends the first verification matching information to the UE in a NAS security activation procedure by using the NAS security mode command message, so that the UE determines, based on the first verification matching information, whether the UE capability information received by the MME is consistent with that sent by the UE.

Step S12: The UE determines, based on the first verification matching information, whether the UE capability information received by the MME is consistent with UE capability information sent by the UE to the MME.

Step S13: If the UE capability information received by the MME is consistent with the UE capability information sent by the UE to the MME, the UE sends a NAS security mode complete message to the MME.

According to the method in this embodiment of the present disclosure, the UE verifies, based on the received first verification matching message, whether the UE capability information received by the MME is consistent with the UE capability information sent by the UE to the MME. It can be learned that, in the embodiments of the present disclosure, the MME sends back the verification matching message, and the UE verifies the UE capability information received by the MME, to ensure that the MME possesses correct UE capability information. This resolves a DoS attack problem caused by that in an attach procedure, an attach request message is not protected by a NAS security context, an attacker may modify the UE capability information, and the MME cannot obtain a correct UE capability.

DoS is an abbreviation of Denial of Service, and an attack behavior causing the DoS is referred to as a DoS attack.

In the foregoing method of Embodiment 1 of the present disclosure, the first verification matching information may be implemented in a plurality of different manners, and descriptions are provided below with reference to specific embodiments.

Figure 2:
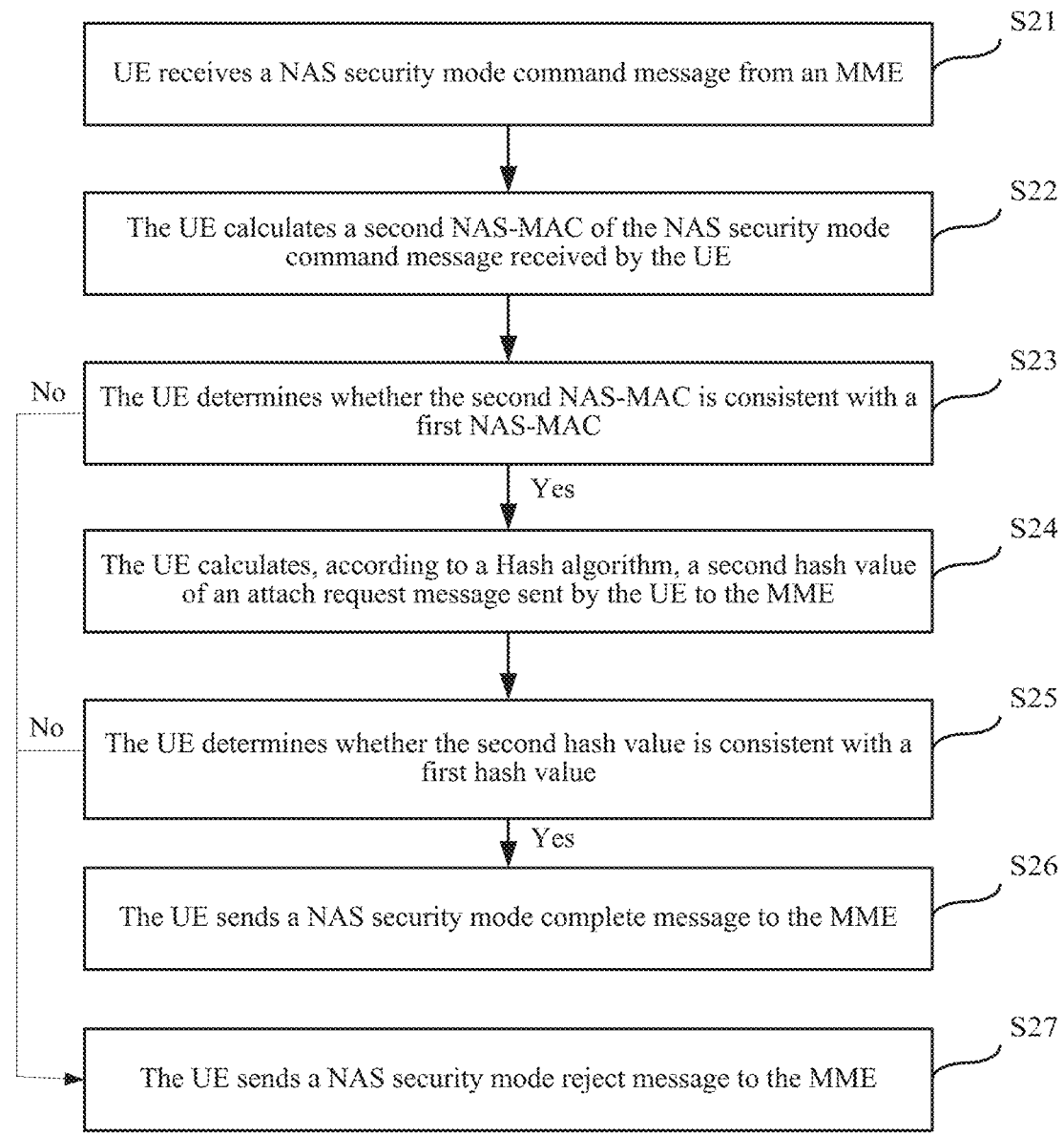
FIG. 2 is a flowchart of a mobile communication method according to Embodiment 2 of the present disclosure.

FIG. 2 is a flowchart of a mobile communication method according to Embodiment 2 of the present disclosure. In this method, an MME performs Hash calculation on a received attach request message to obtain a hash value of the attach request message, and sends the hash value of the attach request message to UE by using a NAS security mode command message, so that the UE verifies the hash value of the attach request message, to determine whether UE capability information received by the MME is consistent with that sent by the UE to the MME. As shown in FIG. 2, this method includes the following main processing steps.

Step S21: The UE receives a NAS security mode command message from the MME.

A first verification matching message carried in the NAS security mode command message is a first hash value of an attach request message received in an attach procedure, where the first hash value is obtained by the MME by performing Hash calculation on the attach request message, and the NAS security mode command message further includes a Hash algorithm (optionally carried) used by the MME to perform Hash calculation on the received attach request message, an integrity algorithm used by the MME, a key identifier, and a first non-access stratum message authentication code (NAS-MAC) of the NAS security mode command message. The first NAS-MAC is used to protect integrity of the NAS security mode command message.

Further, the NAS security mode command message may further include an encryption algorithm supported by both the MME and the UE, an optionally carried international mobile equipment identity (IMEI) request, and an optionally carried [$NONCE_{UE}$, $NONCE_{MME}$] used for mapping of an idle mobile security context, where $NONCE_{UE}$ is a random number selected by the UE, and $NONCE_{MME}$ is a random number selected by the MME.

Step S22: The UE calculates a second NAS-MAC of the NAS security mode command message received by the UE.

In this step, the UE performs, in a manner in which the MME performs integrity protection on the sent NAS security mode command message, calculation on the NAS security mode command message received by the UE, to obtain the second NAS-MAC.

If the NAS security mode command message is not subject to a man-in-the-middle attack in a sending procedure, the first NAS-MAC is consistent with the second NAS-MAC.

Step S23: The UE determines whether the second NAS-MAC is consistent with a first NAS-MAC, and if the second NAS-MAC is consistent with the first NAS-MAC, performs step S24, or if the second NAS-MAC is inconsistent with the first NAS-MAC, performs step S27.

Step S24: The UE calculates, according to a Hash algorithm, a second hash value of an attach request message sent by the UE to the MME.

The UE performs, by using the Hash algorithm, Hash calculation on the attach request message sent by the UE to the MME in the attach procedure. If the attach request message is not modified by an attacker performing a man-in-the-middle attack in the attach procedure, the second hash value calculated by the UE is consistent with the first hash value in the NAS security mode command message.

Further, in this embodiment of the present disclosure, a hash value of the attach request message is carried in the NAS security mode command message, so as to reduce a length of the attach request message, and improve an information sending rate.

Step S25: The UE determines whether the second hash value is consistent with a first hash value, and if the second hash value is consistent with the first hash value, performs step S26; otherwise, performs step S27.

Step S26: The UE sends a NAS security mode complete message to the MME.

The NAS security mode complete message optionally carries an [IMEI] and carries a NAS-MAC for performing security protection on the NAS security mode complete message.

Step S27: The UE sends a NAS security mode reject message to the MME.

In this embodiment, the UE verifies integrity of the received NAS security mode command message and a hash value of the attach request message received by the MME. When the second hash value is consistent with the first hash value and the second NAS-MAC is consistent with the first NAS-MAC, the UE determines that the NAS security mode command message received by the UE is not modified, and the attach request message received by the MME in the UE attach procedure is consistent with that sent by the UE to the MME, thereby ensuring that the UE capability information in the attach request message received by the MME is consistent with the UE capability information sent by the UE.

When at least one of the hash value of the attach request message and integrity of the NAS-MAC is verified unsuccessfully, it indicates that at least one of the attach request message received by the MME and the NAS security mode command message is under attack and is modified. In this case, the UE sends the NAS security mode reject message to the MME.

In this embodiment, the UE verifies, by verifying the hash value of the attach request message of the MME, the UE capability information received by the MME. This ensures that the UE capability information received by the MME is correct UE capability information.

In this embodiment, the first verification matching message may be transmitted by occupying an information element (IE), used for sending back a UE security capability by the MME, in a conventional specification, or may be transmitted by using a new IE.

Figure 3:
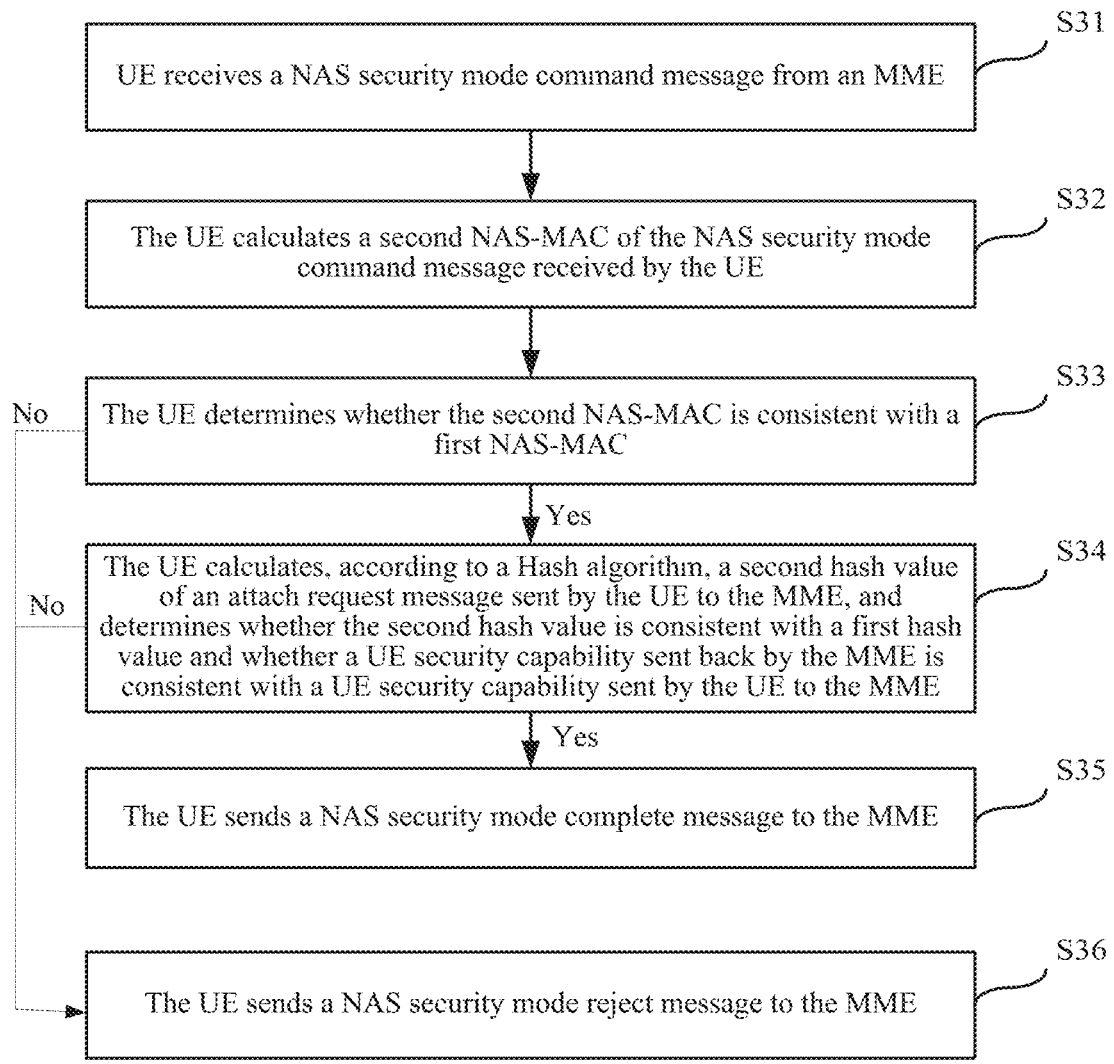
FIG. 3 is a flowchart of a mobile communication method according to Embodiment 3 of the present disclosure.

FIG. 3 is a flowchart of a mobile communication method according to Embodiment 3 of the present disclosure. In this method, an MME sends, by using a NAS security mode command message, a received UE security capability and a hash value of a received attach request message to UE, so that the UE verifies the hash value of the attach request message and the UE security capability, to determine whether UE capability information received by the MME is consistent with that sent by the UE to the MME. As shown in FIG. 3, this method includes the following main processing steps.

Step S31: The UE receives a NAS security mode command message from the MME.

A first verification matching message carried in the NAS security mode command message is a first hash value of an attach request message received in an attach procedure, where the first hash value is obtained after the MME performs Hash calculation on the attach request message, and the NAS security mode command message further includes the UE security capability received by the MME in the attach procedure, a Hash algorithm (optionally carried) used by the MME to perform Hash calculation on the received attach request message, an integrity algorithm supported by both the MME and the UE, a key identifier, and a first NAS-MAC of the NAS security mode command message. The first NAS-MAC is used to protect integrity of the NAS security mode command message.

Further, the security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S32: The UE calculates a second NAS-MAC of the NAS security mode command message received by the UE.

In this step, the UE performs, in a manner in which the MME performs integrity protection on the sent NAS security mode command message, calculation on the NAS security mode command message received by the UE, to obtain the second NAS-MAC.

If the NAS security mode command message is not subject to a man-in-the-middle attack in a sending procedure, the first NAS-MAC is consistent with the second NAS-MAC.

Step S33: The UE determines whether the second NAS-MAC is consistent with a first NAS-MAC, and if the second NAS-MAC is consistent with the first NAS-MAC, performs step S34, or if the second NAS-MAC is inconsistent with the first NAS-MAC, performs step S36.

Step S34: The UE calculates, according to the Hash algorithm, a second hash value of the attach request message sent by the UE to the MME, and determines whether the second hash value is consistent with the first hash value and whether a UE security capability sent back by the MME is consistent with a UE security capability sent by the UE to the MME (a sequence of the hash value calculation, the hash value determining, and the UE security capability determining is not limited), and if the second hash value is consistent with the first hash value and the UE security capability sent back by the MME is consistent with the UE security capability sent by the UE to the MME, performs step S35; otherwise, performs step S36.

The UE performs, by using the Hash algorithm, Hash calculation on the attach request message sent by the UE to the MME in the attach procedure, and if the attach request message is not modified by an attacker performing a man-in-the-middle attack in the attach procedure, the second hash value calculated by the UE is consistent with the first hash value in the NAS security mode command message.

Further, in this embodiment of the present disclosure, a hash value of the attach request message is carried in the NAS security mode command message, so as to reduce a length of the attach request message, and improve an information sending rate.

Step S35: The UE sends a NAS security mode complete message to the MME.

The NAS security mode complete message optionally carries an [IMEI] and carries a NAS-MAC for performing security protection on the NAS security mode complete message.

Step S36: The UE sends a NAS security mode reject message to the MME.

In this embodiment of the present disclosure, the UE verifies, by verifying the hash value of the attach request message received by the MME and the UE security capability, the UE capability received by the MME, to ensure that the UE capability information received by the MME is correct UE capability information.

In this embodiment of the present disclosure, the first verification matching message can be transmitted by using only a new IE.

Figure 4:
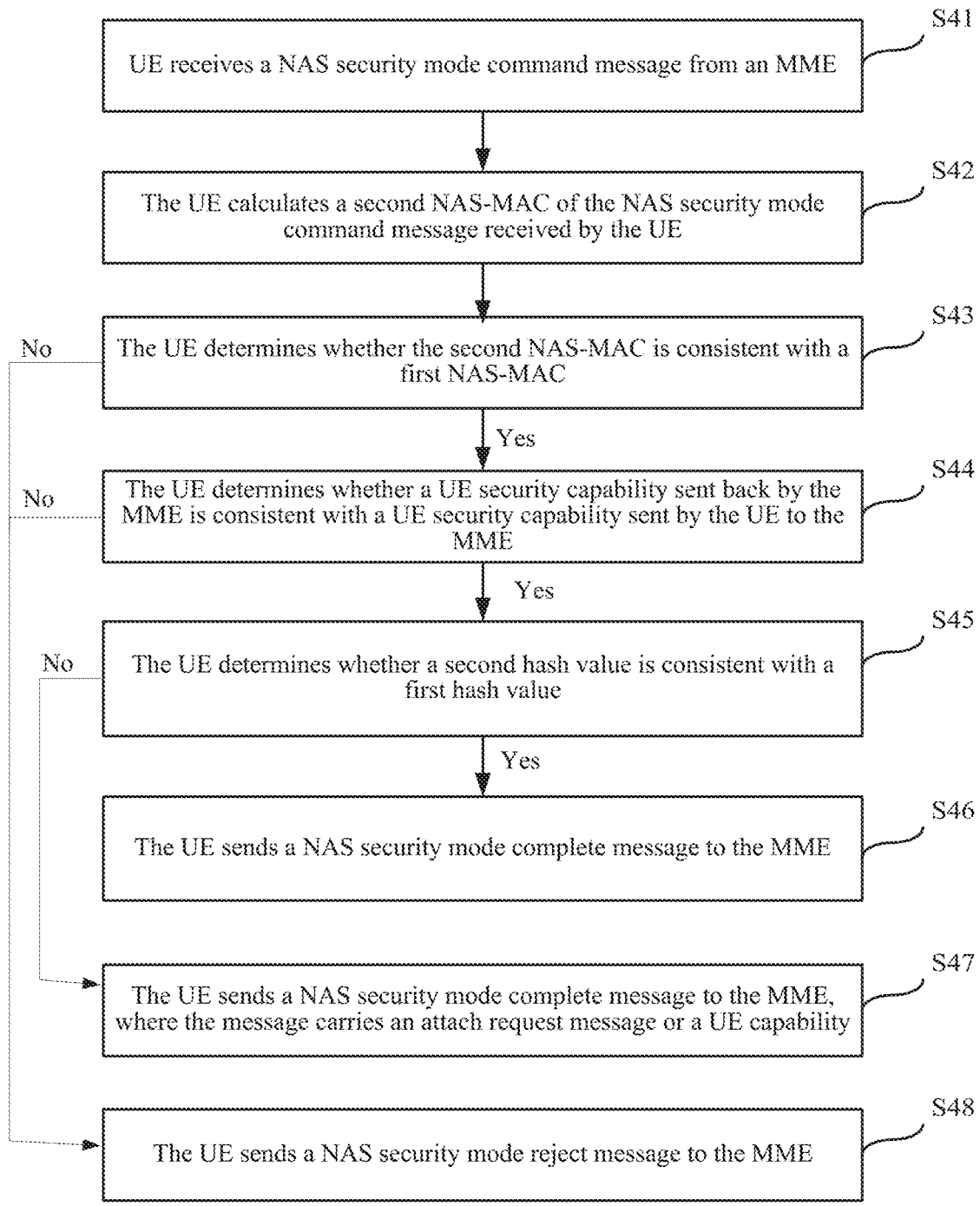
FIG. 4 is a flowchart of a mobile communication method according to Embodiment 4 of the present disclosure.

FIG. 4 is a flowchart of a mobile communication method according to Embodiment 4 of the present disclosure. In this method, an MME sends, by using a NAS security mode command message, a received UE security capability and a hash value of a received attach request message to UE, so that the UE verifies the hash value of the attach request message and the UE security capability, to determine whether UE capability information received by the MME is consistent with that sent by the UE to the MME. As shown in FIG. 4, this method includes the following main processing steps.

Step S41: The UE receives a NAS security mode command message from the MME.

A first verification matching message carried in the NAS security mode command message is a first hash value of an attach request message received in an attach procedure, where the first hash value is obtained after the MME performs Hash calculation on the attach request message, and the NAS security mode command message further includes the UE security capability received by the MME in the attach procedure, a Hash algorithm (optionally carried) used by the MME to perform Hash calculation on the received attach request message, an integrity algorithm used by the MME, a key identifier, and a first NAS-MAC of the NAS security mode command message. The first NAS-MAC is used to protect integrity of the NAS security mode command message.

Further, the security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S42: The UE calculates a second NAS-MAC of the NAS security mode command message received by the UE.

Step S43: The UE determines whether the second NAS-MAC is consistent with a first NAS-MAC, and if the second NAS-MAC is consistent with the first NAS-MAC, performs step S44, or if the second NAS-MAC is inconsistent with the first NAS-MAC, performs step S48.

Step S44: The UE determines whether a UE security capability sent back by the MME is consistent with a UE security capability sent by the UE to the MME, and if the UE security capability sent back by the MME is consistent with the UE security capability sent by the UE to the MME, performs step S45; otherwise, performs step S48.

Step S45: The UE determines whether a second hash value is consistent with a first hash value, and if the second hash value is consistent with the first hash value, performs step S46; or if second hash value is inconsistent with the first hash value, performs step S47.

In this embodiment of the present disclosure, calculation of the second hash value is the same as that in the foregoing embodiment, and details are not described herein again.

Step S46: The UE sends a NAS security mode complete message to the MME.

The NAS security mode complete message optionally carries an [IMEI] and carries a NAS-MAC for performing security protection on the NAS security mode complete message.

Step S47: The UE sends a NAS security mode complete message to the MME, where the message carries an attach request message or a UE capability. In addition to carrying the attach request message, the NAS security mode complete message sent in this step further optionally carries an [IMEI] and carries a NAS-MAC for performing security protection on the NAS security mode complete message.

Step S48: The UE sends a NAS security mode reject message to the MME.

In this embodiment, after integrity of both the UE security capability and the NAS-MAC is verified successfully, a NAS security context is actually set up between the UE and the MME. Therefore, when integrity of the hash value of the attach request message is verified unsuccessfully, attach request content is directly uploaded again to the NAS security mode complete message having integrity protection. This is also a difference between this embodiment and Embodiment 3. A manner used in Embodiment 3 is: even though integrity of the UE security capabilities and the NAS-MAC is verified successfully and a NAS security context is set up between the UE and the MME, if integrity of the hash value of the attach request message is verified unsuccessfully, the UE needs to send the NAS security mode reject message.

In this embodiment of the present disclosure, the first verification matching message can be transmitted by using only a new IE.

Figure 5:
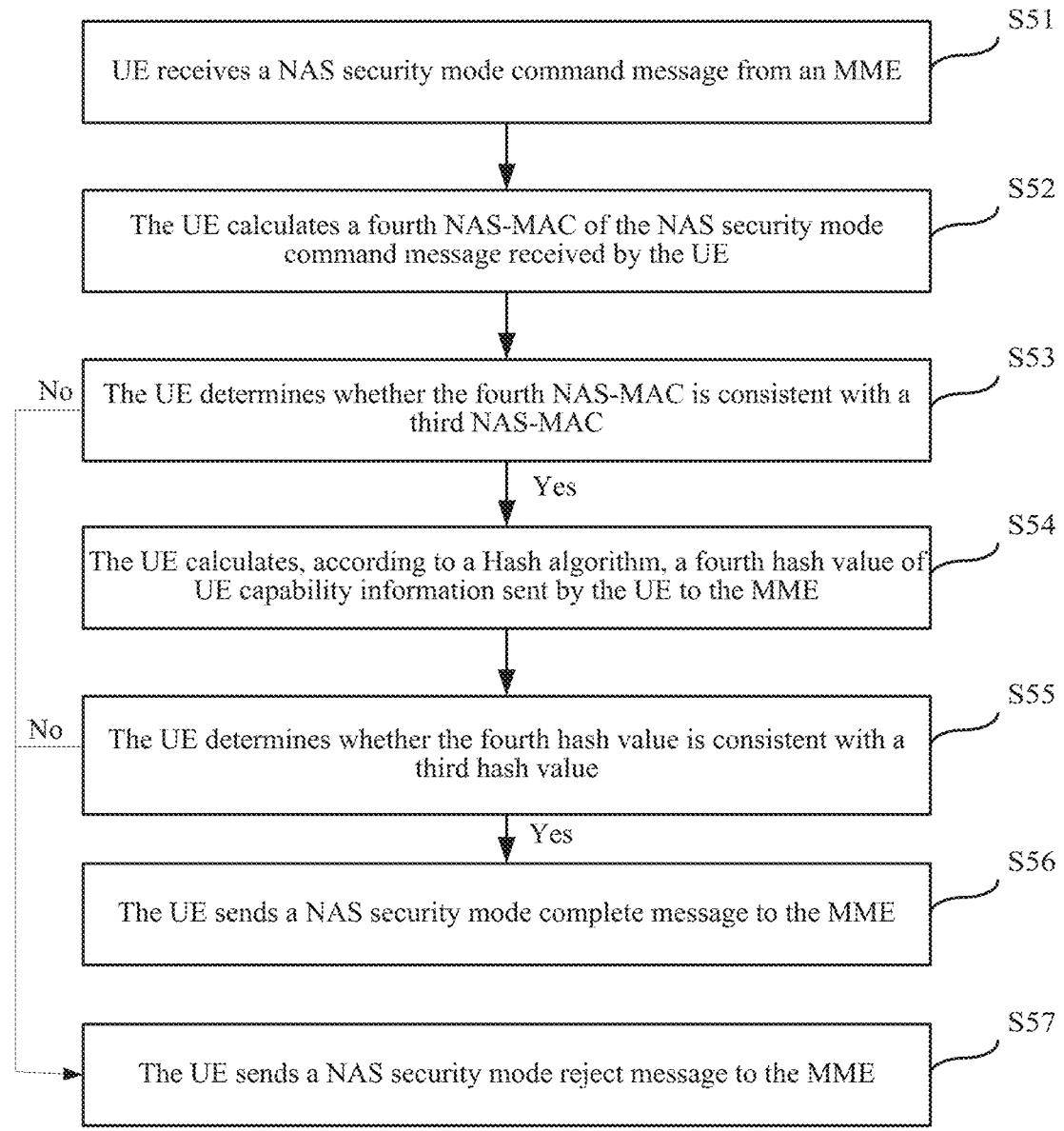
FIG. 5 is a flowchart of a mobile communication method according to Embodiment 5 of the present disclosure.

FIG. 5 is a flowchart of a mobile communication method according to Embodiment 5 of the present disclosure. In this method, an MME performs Hash calculation on received UE capability information to obtain a hash value of the UE capability, and sends the hash value of the UE capability information to UE by using a NAS security mode command message, so that the UE verifies the hash value of the UE capability, to determine whether the UE capability information received by the MME is consistent with that sent by the UE to the MME. As shown in FIG. 5, this method includes the following main processing steps.

Step S51: The UE receives a NAS security mode command message from the MME.

A first verification matching message carried in the NAS security mode command message is a third hash value of UE capability information received in an attach procedure, where the third hash value is obtained after the MME performs Hash calculation on the UE capability information. The NAS security mode command message further includes a Hash algorithm (optionally carried) used by the MME to perform Hash calculation on the received UE capability information, an integrity algorithm supported by both the MME and the UE, a key identifier, and a third NAS-MAC of the NAS security mode command message, where the third NAS-MAC is used to protect integrity of the NAS security mode command message.

Further, the security mode command message may further include an encryption algorithm supported by both the MME and the UE, an optionally carried [IMEI request], and an optionally carried [NONCE$_{UE}$, NONCE$_{MME}$], where NONCE$_{UE}$ is a random number selected by the UE, and NONCE$_{MME}$ is a random number selected by the MME.

Step S52: The UE calculates a fourth NAS-MAC of the NAS security mode command message received by the UE.

In this step, the UE performs, in a manner in which the MME performs integrity protection on the sent NAS security mode command message, calculation on the NAS security mode command message received by the UE, to obtain the fourth NAS-MAC.

If the NAS security mode command message is not under a man-in-the-middle attack in a sending procedure, the third NAS-MAC is consistent with the fourth NAS-MAC.

Step S53: The UE determines whether the fourth NAS-MAC is consistent with a third NAS-MAC, and if the fourth NAS-MAC is consistent with the third NAS-MAC, performs step S54; otherwise, performs step S57.

Step S54: The UE calculates, according to the Hash algorithm, a fourth hash value of UE capability information sent by the UE to the MME.

The UE performs, by using the Hash algorithm, Hash calculation on the UE capability information sent by the UE to the MME in the attach procedure, and if the UE capability information is not modified by an attacker performing a man-in-the-middle attack in the attach procedure, the fourth hash value calculated by the UE is consistent with the third hash value in the NAS security mode command message.

Further, in this embodiment of the present disclosure, a hash value of the UE capability information is carried in the NAS security mode command message, so as to reduce a length of the UE capability information, and improve an information sending rate.

Step S55: The UE determines whether the fourth hash value is consistent with a third hash value, and if the fourth hash value is consistent with the third hash value, performs step S56; otherwise, performs step S57.

Step S56: The UE sends a NAS security mode complete message to the MME.

The NAS security mode complete message optionally carries an [IMEI] and carries a NAS-MAC for performing security protection on the NAS security mode complete message.

Step S57: The UE sends a NAS security mode reject message to the MME.

In this embodiment, the UE verifies integrity of the received NAS security mode command message and the hash value of the UE capability information received by the MME. When the fourth hash value is consistent with the third hash value and the fourth NAS-MAC is consistent with the third NAS-MAC, the UE determines that the NAS security mode command message received by the UE is not modified, and the UE capability information received by the MME in the UE attach procedure is consistent with that sent by the UE to the MME, thereby ensuring that the UE capability information received by the MME is consistent with the UE capability information sent by the UE.

When at least one of the hash value of the UE capability information and integrity of the NAS-MAC is verified unsuccessfully, it indicates that at least one of the UE capability information received by the MME and the NAS security mode command message is under attack and is modified. In this case, the UE sends the NAS security mode reject message to the MME.

In this embodiment, the UE verifies, by verifying the hash value of the UE capability information of the MME, the UE capability information received by the MME, to ensure that the UE capability information received by the MME is correct UE capability information.

In this embodiment, the first verification matching message may be transmitted by occupying an IE for a UE security capability sent back by the MME in a conventional specification, or may be transmitted by using a new IE.

Figure 6:
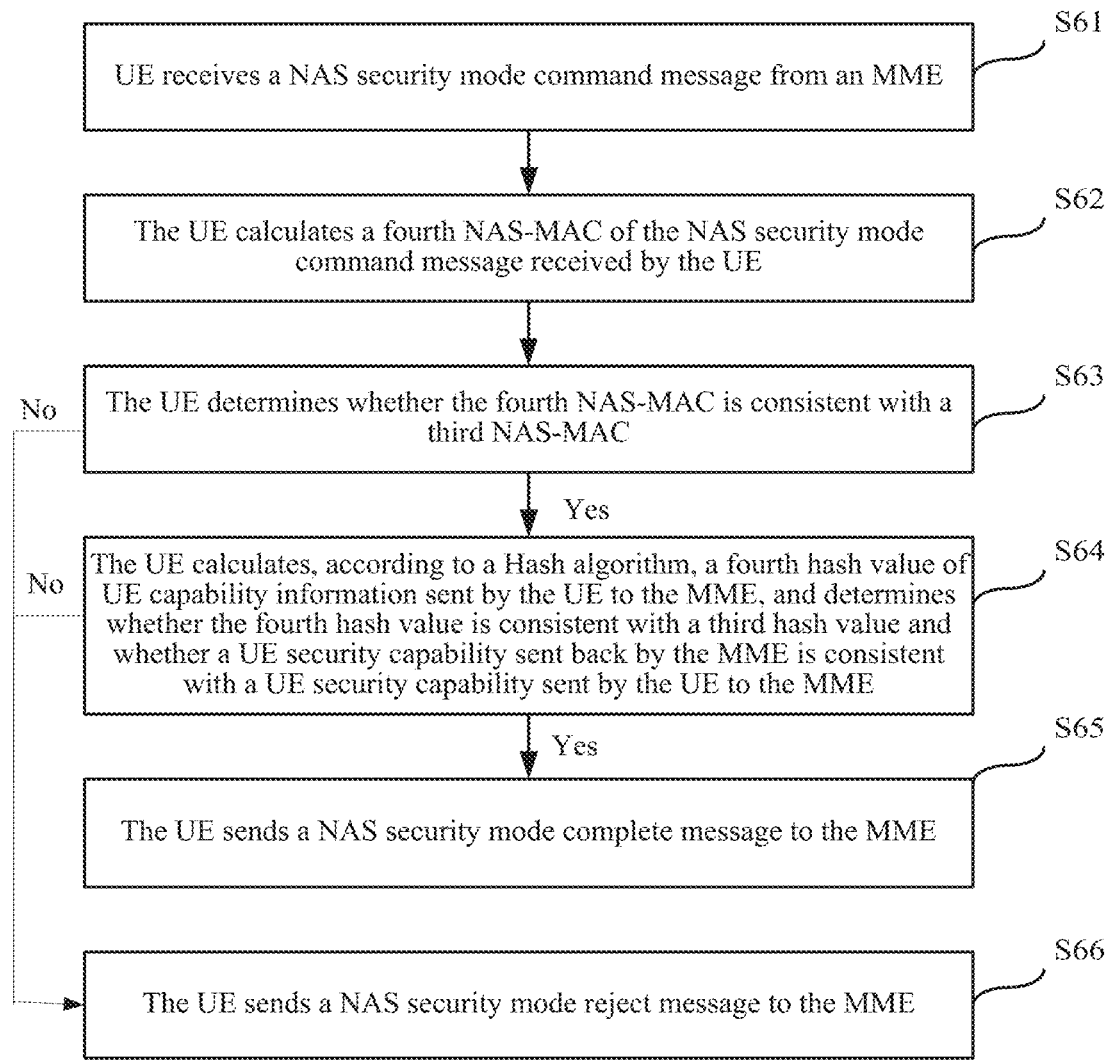
FIG. 6 is a flowchart of a mobile communication method according to Embodiment 6 of the present disclosure.

FIG. 6 is a flowchart of a mobile communication method according to Embodiment 6 of the present disclosure. In this method, an MME sends, by using a NAS security mode command message, a received UE security capability and a hash value of received UE capability information to UE, so that the UE verifies the hash value of the UE capability information and the UE security capability, to determine whether the UE capability information received by the MME is consistent with UE capability information sent by the UE to the MME. As shown in FIG. 6, this method includes the following main processing steps.

Step S61: The UE receives a NAS security mode command message from the MME.

A first verification matching message carried in the NAS security mode command message is a third hash value of UE capability information received in an attach procedure, where the third hash value is obtained after the MME performs Hash calculation on the UE capability information. The NAS security mode command message further includes a UE security capability received by the MME in the attach procedure, a Hash algorithm (optionally carried) used by the MME to perform Hash calculation on the received UE capability information, an integrity algorithm supported by both the MME and the UE, a key identifier, and a third NAS-MAC of the NAS security mode command message, where the third NAS-MAC is used to protect integrity of the NAS security mode command message.

Further, the security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S62: The UE calculates a fourth NAS-MAC of the NAS security mode command message received by the UE.

In this step, the UE performs, in a manner in which the MME performs integrity protection on the sent NAS security mode command message, calculation on the NAS security mode command message received by the UE, to obtain the fourth NAS-MAC.

If the NAS security mode command message is not under a man-in-the-middle attack in a sending procedure, the third NAS-MAC is consistent with the fourth NAS-MAC.

Step S63: The UE determines whether the fourth NAS-MAC is consistent with a third NAS-MAC, and if the fourth NAS-MAC is consistent with the third NAS-MAC, performs step S64; otherwise, performs step S66.

Step S64: The UE calculates, according to the Hash algorithm, a fourth hash value of UE capability information sent by the UE to the MME, and determines whether the fourth hash value is consistent with the third hash value and whether a UE security capability sent back by the MME is consistent with a UE security capability sent by the UE to the MME (a sequence of the hash value calculation, the hash value determining, and the UE security capability determining is not specified), and if the fourth hash value is consistent with the third hash value and the UE security capability sent back by the MME is consistent with the UE security capability sent by the UE to the MME, performs step S65; otherwise, performs step S66.

Step S65: The UE sends a NAS security mode complete message to the MME.

The NAS security mode complete message optionally carries an [IMEI] and carries a NAS-MAC for performing security protection on the NAS security mode complete message.

Step S66: The UE sends a NAS security mode reject message to the MME.

In this embodiment of the present disclosure, the UE verifies, by verifying the hash value of the UE capability information of the MME and the UE security capability, the UE capability received by the MME, to ensure that the UE capability information received by the MME is correct UE capability information. In this embodiment of the present disclosure, the first verification matching message can be transmitted by using only a new IE.

Figure 7:
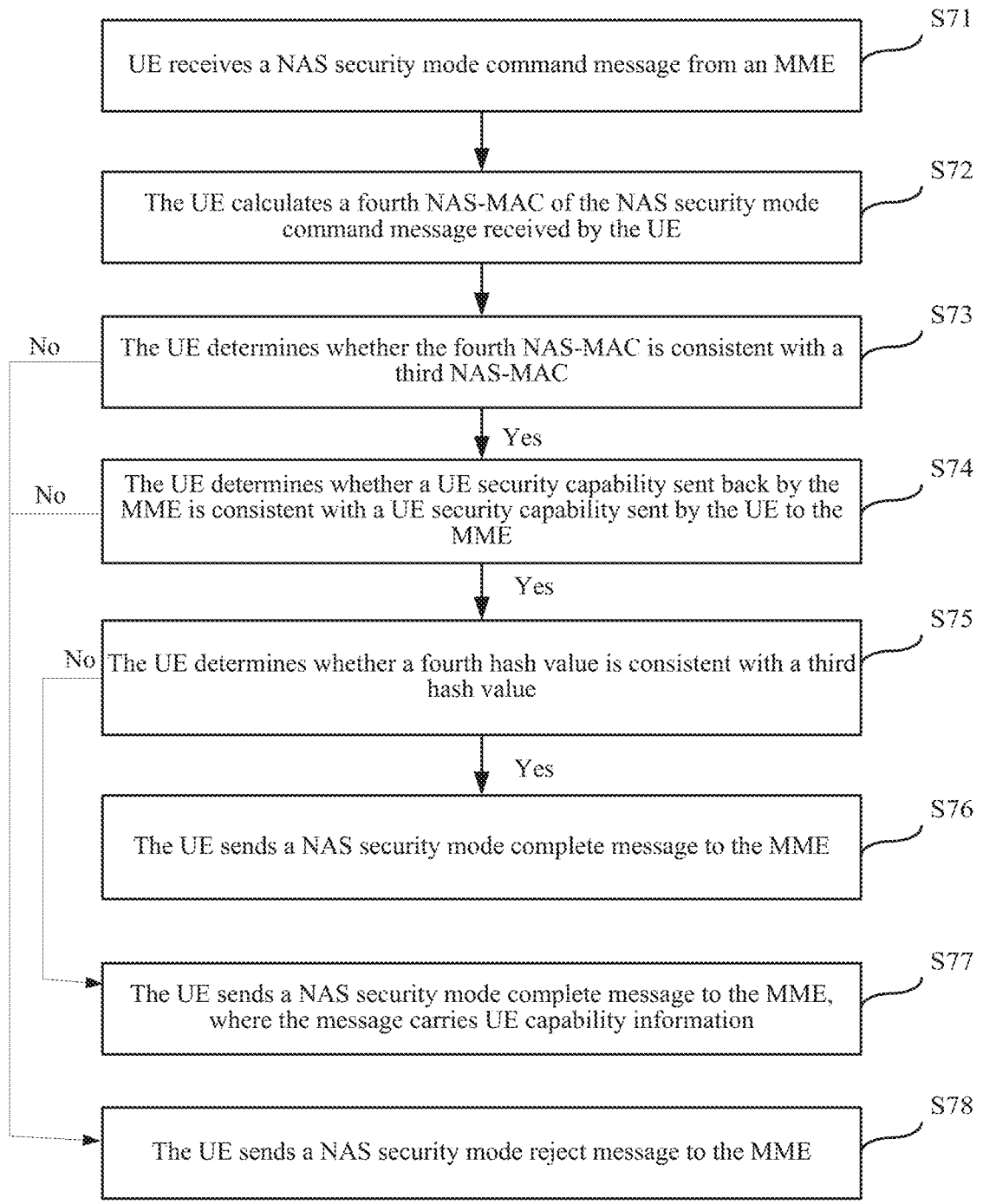
FIG. 7 is a flowchart of a mobile communication method according to Embodiment 7 of the present disclosure.

FIG. 7 is a flowchart of a mobile communication method according to Embodiment 7 of the present disclosure. In this method, an MME sends, by using a NAS security mode command message, a received UE security capability and a hash value of received UE capability information to UE, so that the UE verifies the hash value of the UE capability information and the UE security capability, to determine whether the UE capability information received by the MME is consistent with UE capability information sent by the UE to the MME. As shown in FIG. 7, this method includes the following main processing steps.

Step S71: The UE receives a NAS security mode command message from the MME.

A first verification matching message carried in the NAS security mode command message is a third hash value of UE capability information received in an attach procedure, where the third hash value is obtained after the MME performs Hash calculation on the UE capability information. The NAS security mode command message further includes a UE security capability received by the MME in the attach procedure, a Hash algorithm (optionally carried) used by the MME to perform Hash calculation on the received UE capability information, an integrity algorithm supported by both the MME and the UE, a key identifier, and a third NAS-MAC of the NAS security mode command message, where the third NAS-MAC is used to protect integrity of the NAS security mode command message.

Further, the security mode command message may further include an encryption algorithm supported by both the MME and the UE, an optionally carried [IMEI request], and an optionally carried [$NONCE_{UE}$, $NONCE_{MME}$].

Step S72: The UE calculates a fourth NAS-MAC of the NAS security mode command message received by the UE.

Step S73: The UE determines whether the fourth NAS-MAC is consistent with a third NAS-MAC, and if the fourth NAS-MAC is consistent with the third NAS-MAC, performs step S74; otherwise, performs step S78.

Step S74: The UE determines whether a UE security capability sent back by the MME is consistent with a UE security capability sent by the UE to the MME, and if the UE security capability sent back by the MME is consistent with the UE security capability sent by the UE to the MME, performs step S75; otherwise, performs step S78.

Step S75: The UE determines whether a fourth hash value is consistent with a third hash value, and if the fourth hash value is consistent with the third hash value, performs step S76; or if the fourth hash value is inconsistent with the third hash value, performs step S77.

Step S76: The UE sends a NAS security mode complete message to the MME.

The NAS security mode complete message optionally carries an [IMEI] and carries a NAS-MAC for performing security protection on the NAS security mode complete message.

Step S77: The UE sends a NAS security mode complete message to the MME, where the message carries UE capability information.

In addition to carrying the UE capability information, the NAS security mode complete message sent in this step optionally carries an [IMEI] and carries a NAS-MAC for performing security protection on the NAS security mode complete message.

Step S78: The UE sends a NAS security mode reject message to the MME.

In this embodiment of the present disclosure, the first verification matching message can be transmitted by using only a new IE.

Figure 8:
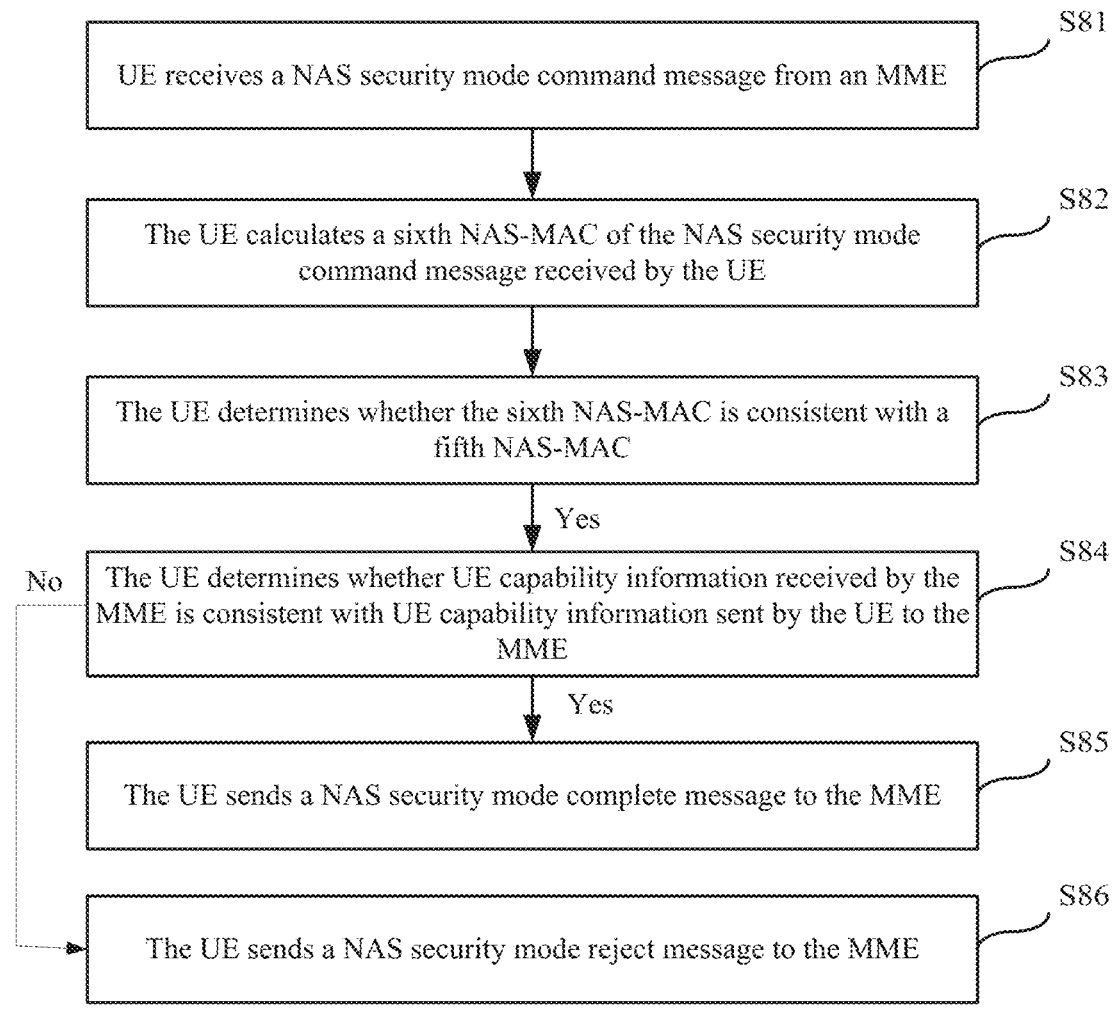
FIG. 8 is a flowchart of a mobile communication method according to Embodiment 8 of the present disclosure.

FIG. 8 is a flowchart of a mobile communication method according to Embodiment 8 of the present disclosure. In this method, an MME sends, by using a NAS security mode command message, UE capability information received in an attach procedure to UE, so as to verify the UE capability information by using the UE. As shown in FIG. 8, this method includes the following main processing steps.

Step S81: The UE receives a NAS security mode command message from the MME.

A first verification matching message carried in the NAS security mode command message is UE capability information received by the MME in an attach procedure. The NAS security mode command message further includes an integrity algorithm supported by both the MME and the UE, a key identifier, and a fifth NAS-MAC of the NAS security mode command message.

Further, the security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S82: The UE calculates a sixth NAS-MAC of the NAS security mode command message received by the UE.

Step S83: The UE determines whether the sixth NAS-MAC is consistent with a fifth NAS-MAC, and if the sixth NAS-MAC is consistent with the fifth NAS-MAC, performs step S84; otherwise, performs step S86.

Step S84: The UE determines whether UE capability information received by the MME is consistent with UE capability information sent by the UE to the MME.

Step S85: If the UE capability information received by the MME is consistent with the UE capability information sent by the UE to the MME, the UE sends a NAS security mode complete message to the MME.

The NAS security mode complete message optionally carries an [IMEI] and carries a NAS-MAC for performing security protection on the NAS security mode complete message.

Step S86: If the sixth NAS-MAC is inconsistent with the fifth NAS-MAC or the UE capability information received by the MME is inconsistent with the UE capability information sent by the UE to the MME, the UE sends a NAS security mode reject message to the MME.

In this embodiment, the first verification matching message may be transmitted by occupying an IE of a UE security capability sent back by the MME in a conventional specification, or may be transmitted by using a new IE, or a UE capability in the first verification matching message other than the UE security capability in the first verification matching message is transmitted by using a new IE.

Figure 9:
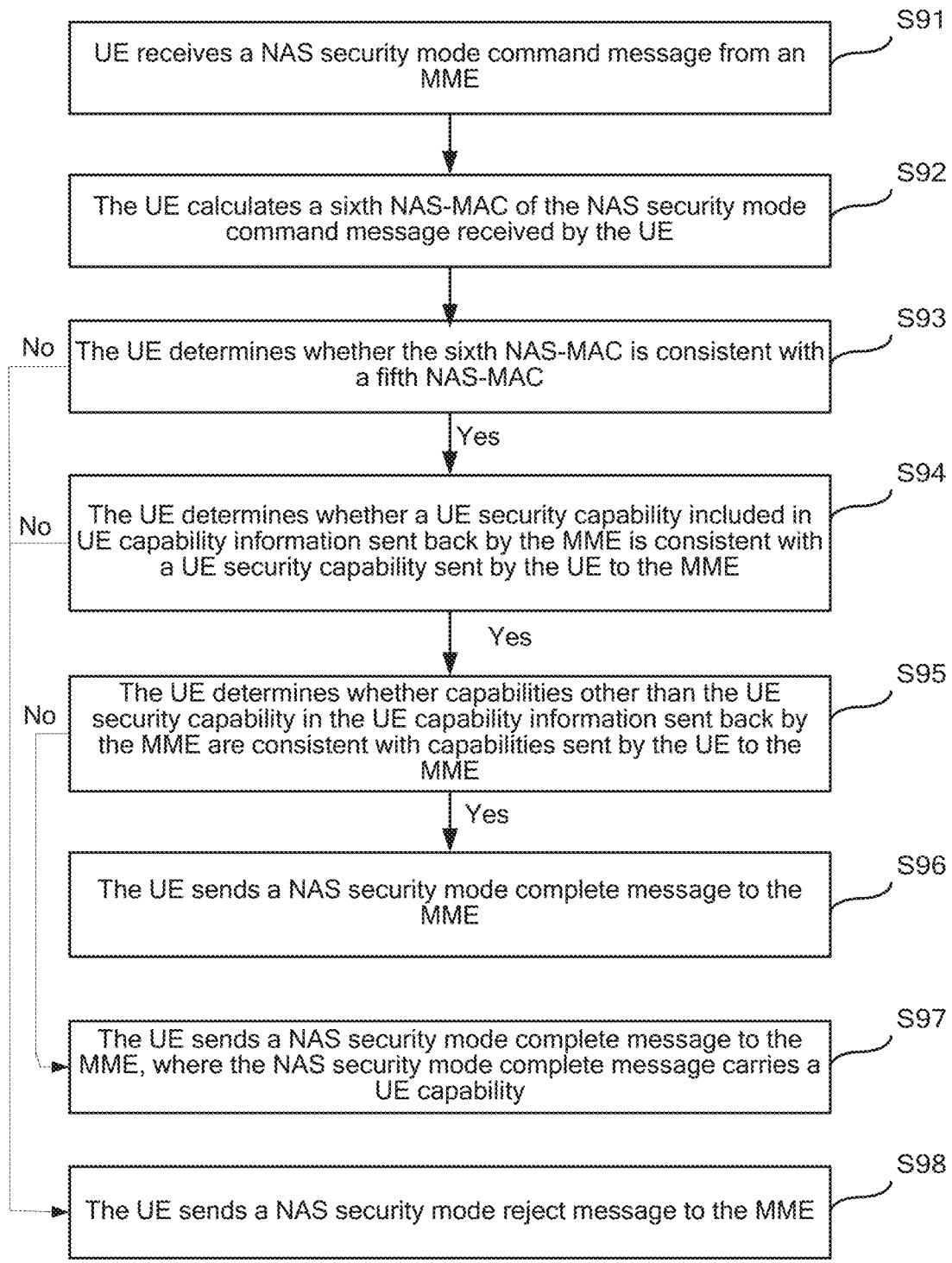
FIG. 9 is a flowchart of a mobile communication method according to Embodiment 9 of the present disclosure.

FIG. 9 is a flowchart of a mobile communication method according to Embodiment 9 of the present disclosure. In this method, an MME sends, by using a NAS security mode command message, UE capability information received in an attach procedure to UE, so as to verify the UE capability information by using the UE. As shown in FIG. 9, this method includes the following main processing steps.

Step S91: The UE receives a NAS security mode command message from the MME.

A first verification matching message carried in the NAS security mode command message is UE capability information received by the MME in an attach procedure. The NAS security mode command message further includes an integrity algorithm supported by both the MME and the UE, a key identifier, and a fifth NAS-MAC of the NAS security mode command message.

Further, the security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S92: The UE calculates a sixth NAS-MAC of the NAS security mode command message received by the UE.

Step S93: The UE determines whether the sixth NAS-MAC is consistent with a fifth NAS-MAC, and if the sixth NAS-MAC is consistent with the fifth NAS-MAC, performs step S94; otherwise, performs step S98.

Step S94: The UE determines whether a UE security capability included in UE capability information sent back by the MME is consistent with a UE security capability sent by the UE to the MME, and if the UE security capability included in the UE capability information sent back by the MME is consistent with the UE security capability sent by the UE to the MME, performs step S95; otherwise, performs step S98.

Step S95: The UE determines whether capabilities other than the UE security capability in the UE capability information sent back by the MME are consistent with capabilities sent by the UE to the MME, and if the capabilities other than the UE security capability in the UE capability information sent back by the MME are consistent with the capabilities sent by the UE to the MME, performs step S96; otherwise, performs step S97.

Step S96: The UE sends a NAS security mode complete message to the MME.

The NAS security mode complete message optionally carries an [IMEI] and carries a NAS-MAC for performing security protection on the NAS security mode complete message.

Step S97: The UE sends a NAS security mode complete message to the MME, where the NAS security mode complete message carries a UE capability.

In addition to carrying the UE capability information, the NAS security mode complete message sent in this step optionally carries an [IMEI] and carries a NAS-MAC for performing security protection on the NAS security mode complete message.

Step S98: The UE sends a NAS security mode reject message to the MME.

In this embodiment, the first verification matching message may be transmitted by occupying an IE of a UE security capability sent back by the MME in a conventional specification, or may be transmitted by using a new IE, or a UE capability in the first verification matching message other than the UE security capability in the first verification matching message is transmitted by using a new IE.

Figure 10:
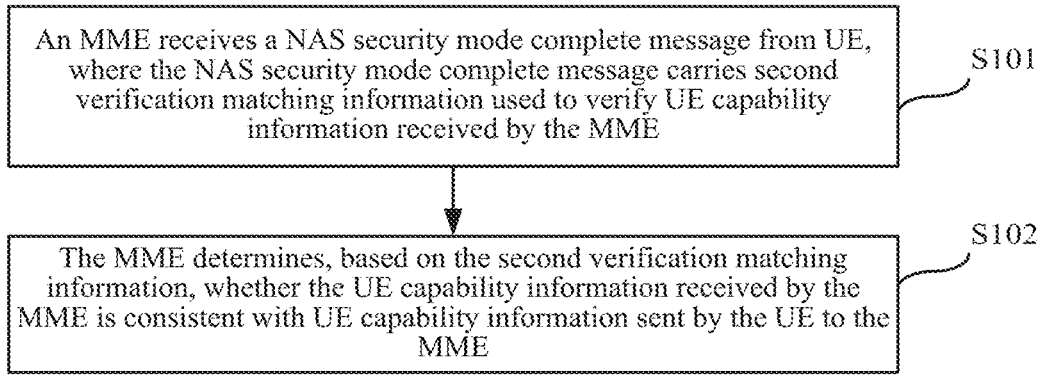
FIG. 10 is a flowchart of a mobile communication method according to Embodiment 10 of the present disclosure.

FIG. 10 is a flowchart of a mobile communication method according to Embodiment 10 of the present disclosure. In this method, UE sends a second verification matching information in a NAS security mode complete message to an MME. As shown in FIG. 10, the method of Embodiment 10 of the present disclosure includes the following main processing steps.

Step S101: The MME receives a NAS security mode complete message from the UE, where the NAS security mode complete message carries second verification matching information used to verify UE capability information received by the MME.

Step S102: The MME determines, based on the second verification matching information, whether the UE capability information received by the MME is consistent with UE capability information sent by the UE to the MME.

In the foregoing method of Embodiment 10 of the present disclosure, the second verification matching information may be implemented in a plurality of different manners, and descriptions are provided below with reference to specific embodiments.

Figure 11:
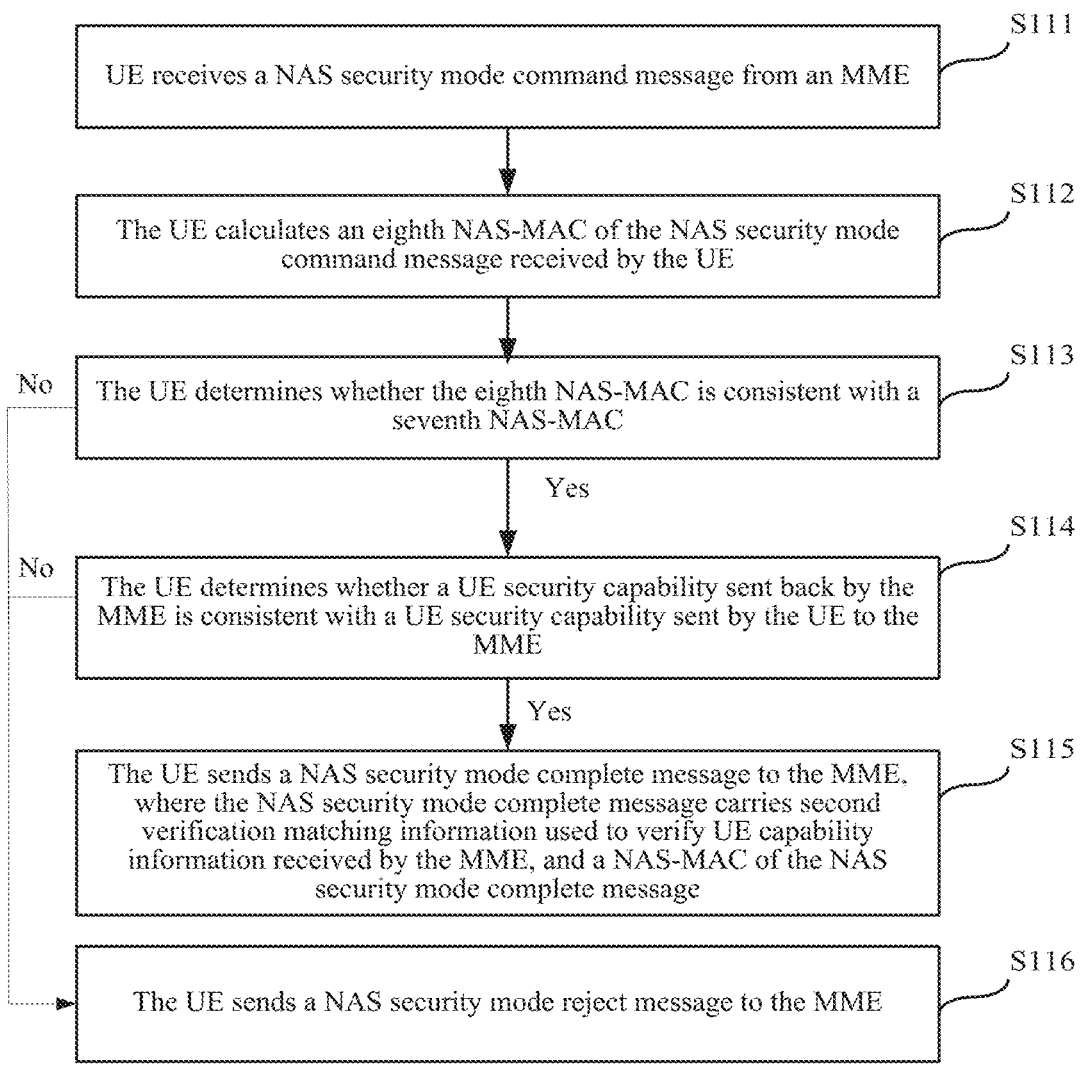
FIG. 11 is a flowchart of a mobile communication method according to Embodiment 11 of the present disclosure.

FIG. 11 is a flowchart of a mobile communication method according to Embodiment 11 of the present disclosure. In this method, an MME sends, by using a NAS security mode command message, UE security capability information received in an attach procedure to UE. As shown in FIG. 11, the method of Embodiment 11 of the present disclosure includes the following main processing steps.

Step S111: The UE receives a NAS security mode command message from the MME.

The NAS security mode command message carries a UE security capability received by the MME in an attach procedure, an integrity algorithm and an optionally carried Hash algorithm that are used by the MME, a key identifier, and a seventh NAS-MAC of the NAS security mode command message.

Further, the NAS security mode command message may further include an encryption algorithm supported by both the MME and the UE, an optionally carried [IMEI request], and an optionally carried [$NONCE_{UE}$, $NONCE_{MME}$], where $NONCE_{UE}$ is a random number selected by the UE, and $NONCE_{MME}$ is a random number selected by the MME.

Step S112: The UE calculates an eighth NAS-MAC of the NAS security mode command message received by the UE.

Step S113: The UE determines whether the eighth NAS-MAC is consistent with a seventh NAS-MAC, and if the eighth NAS-MAC is consistent with the seventh NAS-MAC, performs step S114; otherwise, performs step S116.

Step S114: The UE determines whether a UE security capability sent back by the MME is consistent with a UE security capability sent by the UE to the MME.

Step S115: If the UE security capability sent back by the MME is consistent with the UE security capability sent by the UE to the MME, the UE sends a NAS security mode complete message to the MME, where the NAS security mode complete message carries second verification matching information used to verify UE capability information received by the MME, and a NAS-MAC of the NAS security mode complete message.

In this embodiment of the present disclosure, when integrity of both the UE security capability and the NAS security mode command message is verified successfully, the second verification matching information is sent to the MME, and the MME may verify, by using the received second verification matching information, the UE capability information received in the attach procedure, so as to ensure that the MME obtains correct UE capability information.

The second verification matching information sent by the UE to the MME may further be a hash value of an attach request message sent by the UE to the MME in the attach procedure, or a hash value of UE capability information sent by the UE to the MME in the attach procedure. Additionally, the NAS security mode complete message optionally carries a Hash algorithm (optionally carried) used by the UE and an [IMEI], and carries a NAS-MAC for performing security protection on the NAS security mode complete message.

After receiving the hash value of the attach request message or the hash value of the UE capability information sent by the UE, the MME performs, by using the Hash algorithm, Hash calculation on the attach request message or the UE capability information received in the attach procedure, and determines, by using a calculation result, whether the attach request message or the UE capability information received by the MME in the attach procedure is consistent with that sent by the UE.

If the attach request message or the UE capability information received by the MME in the attach procedure is inconsistent with that sent by the UE, after NAS security activation, the MME requests the UE to resend the UE capability information or attach request content in the following specific implementations.

Implementation 1:
(1) The MME sends a downlink NAS transport message to an eNB, where the downlink NAS transport message includes a UE capability request message or an attach request content request message.
(2) The eNB sends a downlink information transfer message to the UE, where the downlink information transfer message includes the UE capability request message or the attach request content request message.
(3) The UE sends an uplink information transfer message to the eNB, where the message includes a UE capability or attach request message content (Attach request contents).
(4) The eNB sends an uplink NAS transport message to the MME, where the message includes the UE capability or the attach request content.

Implementation 2:
(1) The MME sends a UE information request message to an eNB, where the UE information request message includes a UE capability request message or an attach request content request message.
(2) The eNB sends the UE information request message to the UE.
(3) The UE sends a UE information response message to the eNB, where the UE information response message carries a UE capability or attach request message carried content (Attach request contents).
(4) The eNB sends the UE information response message to the MME, where the UE information response message carries the UE capability or the attach request message contents (Attach request contents).

Step S116: If the eighth NAS-MAC is inconsistent with the seventh NAS-MAC or the UE security capability sent back by the MME is inconsistent with the UE security capability sent by the UE to the MME, the UE sends a NAS security mode reject message to the MME.

Figure 12:
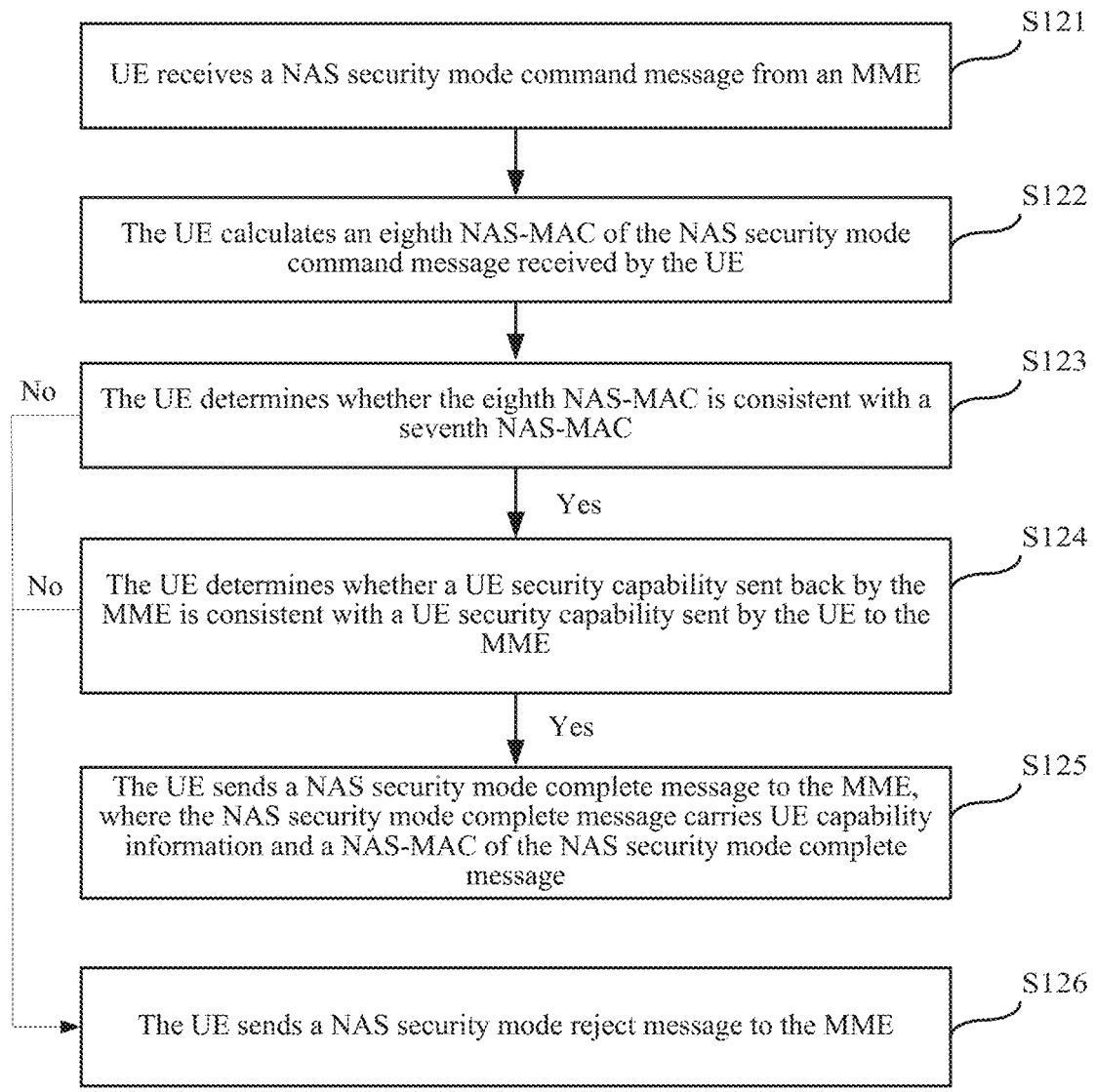
FIG. 12 is a flowchart of a mobile communication method according to Embodiment 12 of the present disclosure.

FIG. 12 is a flowchart of a mobile communication method according to Embodiment 12 of the present disclosure. In this method, an MME sends, by using a NAS security mode command message, UE security capability information received in an attach procedure to UE. As shown in FIG. 12, Embodiment 12 of the present disclosure includes the following main processing steps.

Step S121: The UE receives a NAS security mode command message from the MME.

The NAS security mode command message carries a UE security capability received by the MME in an attach procedure, an integrity algorithm supported by both the MME and the UE, an optionally carried Hash algorithm, a key identifier, and a seventh NAS-MAC of the NAS security mode command message.

Further, the NAS security mode command message may further include an encryption algorithm supported by both the MME and the UE, an optionally carried [IMEI request], and an optionally carried [$NONCE_{UE}$, $NONCE_{MME}$].

Step S122: The UE calculates an eighth NAS-MAC of the NAS security mode command message received by the UE.

Step S123: The UE determines whether the eighth NAS-MAC is consistent with a seventh NAS-MAC, and if the eighth NAS-MAC is consistent with the seventh NAS-MAC, performs step S124; otherwise, performs step S126.

Step S124: The UE determines whether a UE security capability sent back by the MME is consistent with a UE security capability sent by the UE to the MME.

Step S125: If the UE security capability sent back by the MME is consistent with the UE security capability sent by the UE to the MME, the UE sends a NAS security mode complete message to the MME, where the NAS security mode complete message carries UE capability information and a NAS-MAC of the NAS security mode complete message.

In this embodiment of the present disclosure, when integrity of both the UE security capability and the NAS security mode command message is verified successfully, the UE capability information is sent to the MME.

Further, the NAS security mode complete message optionally carries an [IMEI] and carries a NAS-MAC for performing security protection on the NAS security mode complete message, thereby ensuring that the UE capability information in the NAS security mode complete message is not modified. This ensures that the MME obtains correct UE capability information.

Step S126: If the eighth NAS-MAC is inconsistent with the seventh NAS-MAC or the UE security capability sent back by the MME is inconsistent with the UE security capability sent by the UE to the MME, the UE sends a NAS security mode reject message to the MME.

In this embodiment, the UE capability information may be placed in a second verification matching information IE and transmitted, but the MME directly stores the UE capability information, and does not verify again whether the UE capability information is the same as UE capability information in a received attach request.

The present disclosure further provides Embodiment 13 of a mobile communication method. The method of this embodiment includes the following main processing steps: An MME sends a NAS security mode command message to UE, where the NAS security mode command message carries first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

Based on Embodiment 13, in an implementation of Embodiment 13, the first verification matching information is a first hash value of an attach request message received by the MME, and the NAS security mode command message further includes a Hash algorithm (optionally carried) used by the MME to perform Hash calculation on the received attach request message, an integrity algorithm used by the MME, a key identifier, and a first non-access stratum message authentication NAS-MAC of the NAS security mode command message.

Based on Embodiment 13, in an implementation of Embodiment 13, the method further includes the following step.

When a second NAS-MAC of the NAS security mode command message generated by the UE is consistent with the first NAS-MAC, a UE security capability sent back by the MME is consistent with a UE security capability sent by the UE to the MME, and a second hash value of the attach request message generated by the UE is inconsistent with the first hash value, the MME receives the NAS security mode complete message sent by the UE, where the NAS security mode complete message carries the attach request message or the UE capability.

Based on Embodiment 13, in an implementation of Embodiment 13, the first verification matching information is a third hash value of the UE capability information received by the MME, and the NAS security mode command message further includes a Hash algorithm (optionally carried) used by the MME to perform Hash calculation on the received UE capability information, an integrity algorithm used by the MME, a key identifier, and a third NAS-MAC of the NAS security mode command message.

Based on Embodiment 13, in an implementation of Embodiment 13, the method further includes the following step.

When a fourth NAS-MAC generated by the UE is consistent with the third NAS-MAC, a UE security capability sent back by the MME is consistent with a UE security capability sent by the UE to the MME, and a fourth hash value of the UE capability information generated by the UE is inconsistent with the third hash value, the MME receives the NAS security mode complete message sent by the UE, where the NAS security mode complete message carries the UE capability information.

Based on Embodiment 13, in an implementation of Embodiment 13, the first verification matching information is the UE capability information received by the MME, and the NAS security mode command message further includes an integrity algorithm used by the MME, a key identifier, and a fifth NAS-MAC of the NAS security mode command message.

Based on Embodiment 13, in an implementation of Embodiment 13, the method further includes the following step.

When a sixth NAS-MAC generated by the UE is consistent with the fifth NAS-MAC, a UE security capability in the UE capability information received by the MME is consistent with a UE security capability sent by the UE to the MME, and capabilities other than the UE security capability in the UE capability information received by the MME are inconsistent with capabilities sent by the UE to the MME, the UE sends the NAS security mode complete message to the MME, where the NAS security mode complete message carries the UE capability information.

The present disclosure further provides Embodiment 14 of a mobile communication method. This embodiment includes the following main processing steps.

(1) An MME receives a NAS security mode complete message from UE, where the NAS security mode complete message carries second verification matching information used to verify UE capability information received by the MME.

(2) The MME determines, based on the second verification matching information, whether the UE capability information received by the MME is consistent with UE capability information sent by the UE to the MME.

Based on Embodiment 14, in an implementation of Embodiment 14, the second verification matching information includes:
  a hash value of an attach request message sent by the UE to the MME; or
  a hash value of the UE capability information sent by the UE to the MME.

Based on Embodiment 14, in an implementation of Embodiment 14, the second verification matching information includes the UE capability information sent by the UE to the MME.

Based on Embodiment 14, in an implementation of Embodiment 14, the method further includes the following steps.

If the attach request message or the UE capability information received by the MME in the attach procedure is inconsistent with that sent by the UE, the MME sends a downlink NAS transport message to the UE, where the downlink NAS transport message carries a UE capability information request message or an attach request content request message; and the MME receives an uplink information transfer message sent by the UE, where the uplink information transfer message carries UE capability information or attach request content.

Based on Embodiment 14, in an implementation of Embodiment 14, the method further includes the following steps.

If the attach request message or the UE capability received by the MME in the attach procedure is inconsistent with that sent by the UE, the MME sends a UE information request message to the UE, where the UE information request message carries a UE capability information request message or an attach request content request message; and the MME receives a UE information response message sent by the UE, where the UE information response message carries UE capability information or attach request content.

Figure 13:
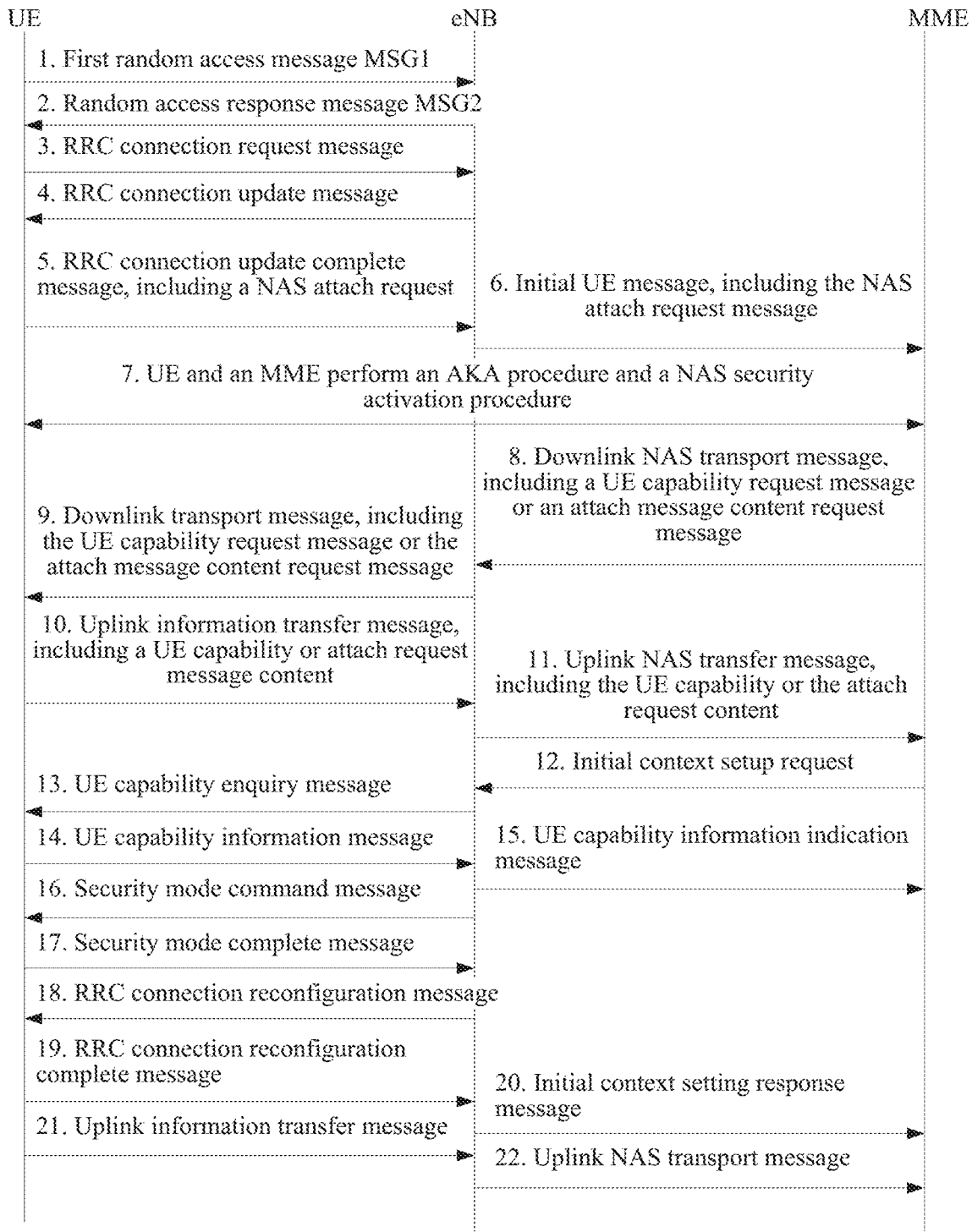
FIG. 13 is a flowchart of a mobile communication method according to Embodiment 15 of the present disclosure.

FIG. 13 is a flowchart of a mobile communication method according to Embodiment 15 of the present disclosure. In the method, a NAS security activation procedure (corresponding to step 7 in FIG. 13) is performed according to a conventional method. After NAS security activation, an MME requests, by using a downlink NAS transport message, UE to upload again a UE capability) or attach request content, and the UE uploads the UE capability or the attach request content by using an uplink NAS transport message, so that the MME obtains a correct UE capability.

As shown in FIG. 13, an execution process of this embodiment includes the following steps.

1. UE in an radio resource control idle (RRC_IDLE) state performs an attach procedure. The UE first initiates a random access procedure, that is, sends a first random access message MSG1.
2. After detecting the MSG1 message, an eNB sends a random access response message, namely, an MSG2 message, to the UE.
3. After receiving the random access response message, the UE adjusts an uplink sending occasion based on a timing advance (TA) in the MSG2, and sends an RRC connection request message to the eNB.
4. The eNB sends an RRC connection update (RRC Connection Setup) message to the UE, where the message includes configuration information for setting up an signaling radio bearer 1 (SRB1) and a radio resource.
5. After completing the SRB1 bearer and the radio resource configuration, the UE sends an RRC connection update complete (RRC Connection Setup Complete) message to the eNB, where the RRC connection update complete message includes a NAS attach request message.
6. The eNB selects an MME, and sends an initial UE message to the MME, where the initial UE message includes the NAS attach request message.
7. The UE and the MME perform an AKA procedure and a NAS security activation procedure.
8. The MME sends a downlink NAS transport message to the eNB, where the downlink NAS transport message includes a UE capability request message or an attach request content request message.
9. The eNB sends a downlink information transfer message to the UE, where the downlink information transfer message includes the UE capability request message or the attach request message content request message.
10. The UE sends an uplink information transfer message to the eNB, where the message includes a UE capability or attach request message content.
11. The eNB sends an uplink NAS transport message to the MME, where the message includes the UE capability or the attach request content.
12. The MME sends an initial context setup request message to the eNB, to request to set up a default bearer, where the initial context setup request message includes a NAS attach request (Attach Accept) message and an activate default evolved packet core (EPC) bearer context request message.
13. After the eNB receives the initial context setup request message, if the initial context setup request message does not include UE capability information, the eNB sends a UE capability enquiry message to the UE, to query for a UE capability.
14. The UE sends a UE capability information message to the eNB, to report the UE capability information.
15. The eNB sends a UE capability information indication message to the MME, to update UE capability information of the MME.
16. The eNB sends a security mode command message to the UE based on UE-supported security information in an initial context setup request message, to perform security activation.
17. The UE sends a security mode complete message to the eNB, to indicate that the security activation is completed.
18. The eNB sends an RRC connection reconfiguration message to the UE based on evolved radio access bearer (ERAB) setup information in the initial context setting request message, to perform UE resource reconfiguration including SRB1 reconfiguration and radio resource configuration, and set up an SRB2, a data radio bearer (DRB) (including the default bearer), and the like.
19. The UE sends an RRC connection reconfiguration complete message to the eNB, to indicate that resource configuration is completed.
20. The eNB sends an initial context setting response message to the MME, to indicate that UE context setup is completed.
21. The UE sends an uplink information transfer message to the eNB, where the message includes a NAS attach complete message and an activate default evolved packet core bearer context accept message.
22. The eNB sends an uplink NAS transport message to the MME, where the message includes the NAS attach complete message and the activate default evolved packet core bearer context accept message.

Step 7 in this embodiment of the present disclosure corresponds to the NAS security activation procedure, and improved steps 8 to 11 in this embodiment of the present disclosure are performed after the NAS security activation procedure.

Figure 14:
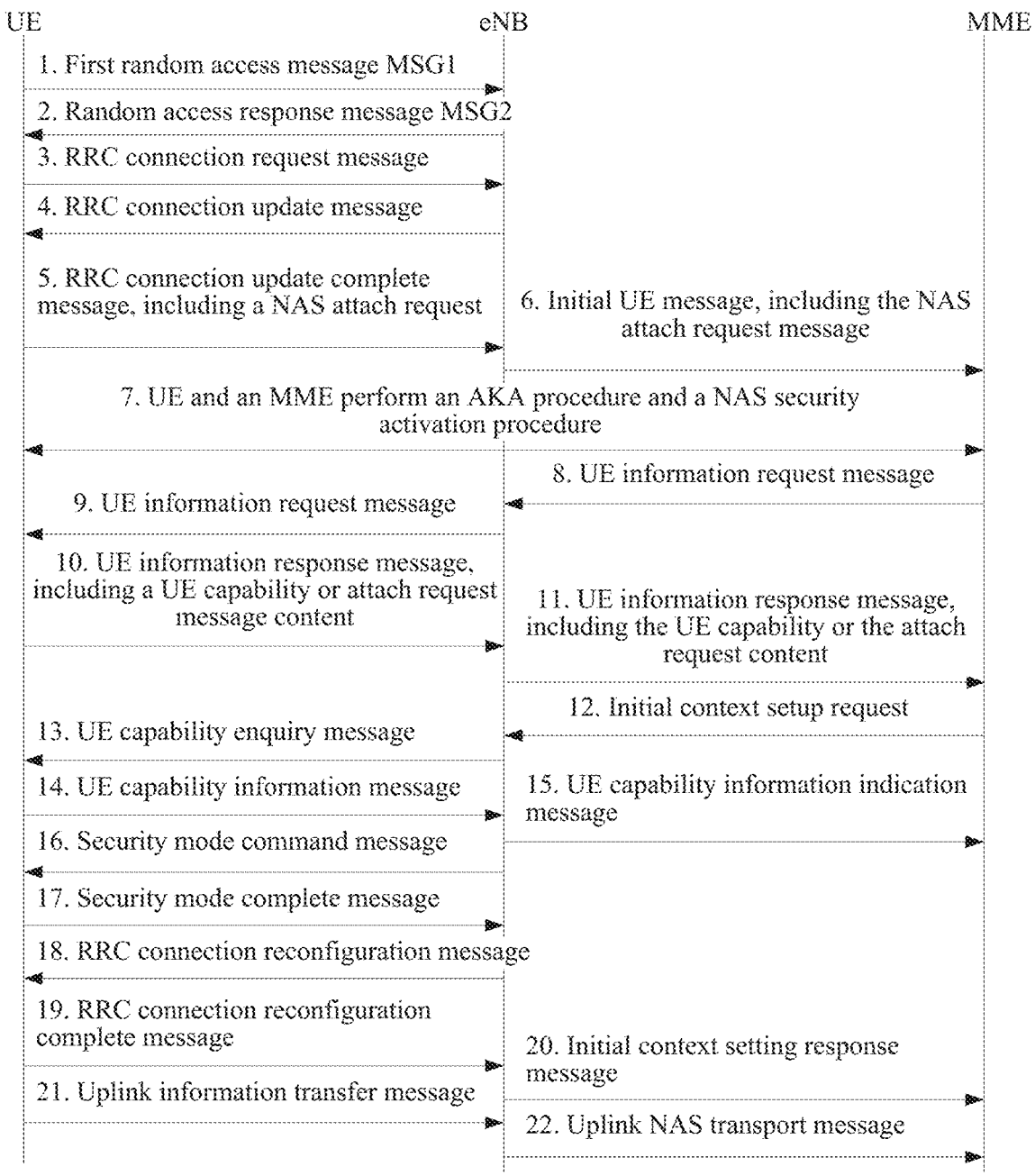
FIG. 14 is a flowchart of a mobile communication method according to Embodiment 16 of the present disclosure.

FIG. 14 is a flowchart of a mobile communication method according to Embodiment 16 of the present disclosure. In the method, a NAS security activation procedure (corresponding to step 7 in FIG. 14) is performed according to a conventional method. In an attach procedure, after NAS security activation, an MME requests, by using a newly defined UE information request message, UE to upload again UE capability information or attach request content, and the UE uploads the UE capability or the attach request content by using a UE information response message, so that the MME obtains a correct UE capability.

As shown in FIG. 14, an execution process of this embodiment includes the following steps.

1. UE in an RRC_IDLE state performs an attach procedure, and the first initiates a random access procedure, that is, sends a first random access message MSG1.
2. After detecting the MSG1 message, an eNB sends a random access response message, namely, an MSG2 message, to the UE.
3. After receiving the random access response message, the UE adjusts an uplink sending occasion based on a timing advance (TA) in the MSG2, and sends an RRC connection request message to the eNB.
4. The eNB sends an RRC connection update (RRC Connection Setup) message to the UE, where the message includes configuration information for setting up an SRB1 and a radio resource.
5. After completing the SRB1 bearer and the radio resource configuration, the UE sends an RRC connection update complete (RRC Connection Setup Complete) message to the eNB, where the RRC update complete message includes a NAS attach request message.
6. The eNB selects an MME, and sends an initial UE message to the MME, where the initial UE message includes the NAS attach request message.
7. The UE and the MME perform an AKA procedure and a NAS security activation procedure.
8. The MME sends a UE information request message to the eNB.
9. The eNB sends the UE information request) message to the UE.
10. The UE sends a UE information response message to the eNB, where the UE information response message carries a UE capability or attach request message carried content (Attach request contents).
11. The eNB sends the UE information response message to the MME, where the UE information response message carries the UE capability or the attach request message carried content.
12. The MME sends an initial context setup request message to the eNB, to request to set up a default bearer, where the initial context setup request message includes a NAS attach request (Attach Accept) message and an activate default evolved packet core (EPC) bearer context request message.
13. After the eNB receives the initial context setup request message, if the initial context setup request message does not include UE capability information, the eNB sends a UE capability enquiry message to the UE, to query for a UE capability.
14. The UE sends a UE capability information message to the eNB, to report the UE capability information.
15. The eNB sends a UE capability information indication message to the MME, to update UE capability information of the MME.
16. The eNB sends a security mode command message to the UE based on UE-supported security information in an initial context setting request message, to perform security activation.
17. The UE sends a security mode complete message to the eNB, to indicate that the security activation is completed.
18. The eNB sends an RRC connection reconfiguration message to the UE based on evolved radio access bearer (ERAB) setup information in the initial context setting request message, to perform UE resource reconfiguration including SRB1 reconfiguration and radio resource configuration, and set up an SRB2, a DRB (including the default bearer), and the like.
19. The UE sends an RRC connection reconfiguration complete message to the eNB, to indicate that resource configuration is completed.
20. The eNB sends an initial context setting response message to the MME, to indicate that UE context setup is completed.
21. The UE sends an uplink information transfer message to the eNB, where the message includes a NAS attach complete message and an activate default evolved packet core bearer context accept message.
22. The eNB sends an uplink NAS transport message to the MME, where the message includes the NAS attach complete message and the activate default evolved packet core bearer context accept message.

Step 7 in this embodiment of the present disclosure corresponds to the NAS activation procedure, and improved steps 8 to 11 in this embodiment of the present disclosure are performed after the NAS activation procedure.

Figure 15:
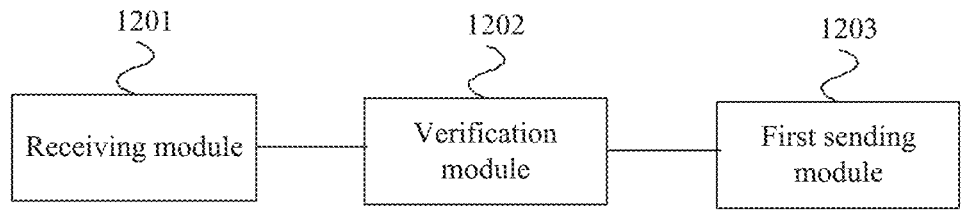
FIG. 15 is a schematic structural diagram of a mobile communications apparatus according to Embodiment 1 of the present disclosure.

FIG. 15 is a schematic structural diagram of a mobile communications apparatus according to Embodiment 1 of the present disclosure. The apparatus is deployed in UE, and includes: a receiving module 1201, a verification module 1202, and a first sending module 1203.

The receiving module 1201 is configured to receive a non-access stratum NAS security mode command message from a mobility management entity MME, where the NAS security mode command message carries first verification matching information used to verify UE capability information received by the MME.

The verification module 1202 is configured to determine, based on the first verification matching information, whether the UE capability information received by the MME is consistent with UE capability information sent by the UE to the MME.

The first sending module 1203 is configured to: when the UE capability information received by the MME is consistent with the UE capability information sent by the UE to the MME, send a NAS security mode complete message to the MME.

In the foregoing embodiment, the first verification matching information is a first hash value of an attach request message that is received by the MME before the MME sends the NAS security mode command message to the UE, and the NAS security mode command message further includes a Hash algorithm used by the MME to perform Hash calculation on the received attach request message, an integrity algorithm used by the MME, a key identifier, and a first non-access stratum message authentication code NAS-MAC of the NAS security mode command message.

The verification module 1202 is configured to:

calculate a second NAS-MAC of the NAS security mode command message received by the UE;
determine whether the second NAS-MAC is consistent with the first NAS-MAC;
if the second NAS-MAC is consistent with the first NAS-MAC, calculate, according to the Hash algorithm, a second hash value of the attach request message sent by the UE to the MME; and
determine whether the second hash value is consistent with the first hash value.

The first sending module 1203 is configured to: when the second hash value is consistent with the first hash value and the second NAS-MAC is consistent with the first NAS-MAC, send the NAS security mode complete message to the MME.

In the foregoing embodiment, the NAS security mode command message further includes a UE security capability sent back by the MME.

The verification module 1202 is further configured to:
determine whether the UE security capability sent back by the MME is consistent with a UE security capability sent by the UE to the MME.

The first sending module 1203 is configured to:
if the second hash value is consistent with the first hash value, the second NAS-MAC is consistent with the first NAS-MAC, and the UE security capability sent back by the MME is consistent with the UE security capability sent by the UE to the MME, send the NAS security mode complete message to the MME.

In the foregoing embodiment, the first sending module 1203 is further configured to:
if at least one of the second hash value, the second NAS-MAC, and the UE security capability sent back by the MME is verified unsuccessfully, send a NAS security mode reject message to the MME; or
further configured to: if the second NAS-MAC is consistent with the first NAS-MAC, the UE security capability sent back by the MME is consistent with the UE security capability sent by the UE to the MME, and the second hash value is inconsistent with the first hash value, send the NAS security mode complete message to the MME, where the NAS security mode complete message carries the attach request message.

In the foregoing embodiment, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message.

The verification module 1202 is configured to:
calculate a fourth NAS-MAC of the NAS security mode command message received by the UE;
determine whether the fourth NAS-MAC is consistent with the third NAS-MAC;
if the fourth NAS-MAC is consistent with the third NAS-MAC, calculate, according to the Hash algorithm, a fourth hash value of the UE capability information sent by the UE to the MME; and
determine whether the fourth hash value is consistent with the third hash value.

The first sending module 1203 is configured to: if the fourth hash value is consistent with the third hash value, send, for the UE, the NAS security mode complete message to the MME.

In the foregoing embodiment, the NAS security mode command message further includes a UE security capability sent back by the MME.

The verification module 1202 is further configured to:
determine whether the UE security capability sent back by the MME is consistent with a UE security capability sent by the UE to the MME.

The first sending module 1203 is configured to:
if the fourth hash value is consistent with the third hash value, the fourth NAS-MAC is consistent with the third NAS-MAC, and the UE security capability sent back by the MME is consistent with the UE security capability sent by the UE to the MME, send the NAS security mode complete message to the MME.

In the foregoing embodiment, the first sending module 1203 is further configured to:
if at least one of the fourth hash value, the fourth NAS-MAC, and the UE security capability sent back by the MME is verified unsuccessfully, send, for the UE, a NAS security mode reject message to the MME; or
the first sending module 1203 is further configured to: if the fourth NAS-MAC is consistent with the third NAS-MAC, the UE security capability sent back by the MME is consistent with the UE security capability sent by the UE to the MME, and the fourth hash value is inconsistent with the third hash value, send, for the UE, the NAS security mode complete message to the MME, where the NAS security mode complete message carries the UE capability information.

In the foregoing embodiment, the first verification matching information is the UE capability information received by the MME, and the NAS security mode command message further includes an integrity algorithm used by the MME, a key identifier, and a fifth NAS-MAC of the NAS security mode command message.

The verification module 1202 is configured to:
calculate a sixth NAS-MAC of the NAS security mode command message received by the UE;
determine, for the UE, whether the sixth NAS-MAC is consistent with the fifth NAS-MAC; and
determine whether the UE capability information received by the MME is consistent with the UE capability information sent by the UE to the MME.

The first sending module 1203 is configured to: if the UE capability information received by the MME is consistent with the UE capability information sent by the UE to the MME, send the NAS security mode complete message to the MME.

In the foregoing embodiment, the verification module 1202 is configured to:
determine whether the sixth NAS-MAC is consistent with the fifth NAS-MAC;
if the sixth NAS-MAC is consistent with the fifth NAS-MAC, determine whether a UE security capability included in the UE capability information received by the MME is consistent with a UE security capability sent by the UE to the MME; and
if the UE security capability included in the UE capability information received by the MME is consistent with the UE security capability sent by the UE to the MME, determine, for the UE, whether capabilities other than the UE security capability in the UE capability information received by the MME are consistent with capabilities sent by the UE to the MME.

The first sending module 1203 is configured to: if the capabilities other than the UE security capability in the UE capability information received by the MME are consistent with the capabilities sent by the UE to the MME, send the NAS security mode complete message to the MME.

In the foregoing embodiment, the first sending module 1203 is further configured to:
  if the capabilities other than the UE security capability in the UE capability information received by the MME are inconsistent with the capabilities sent by the UE to the MME, send the NAS security mode complete message to the MME, where the NAS security mode complete message carries the UE capability information.

In the foregoing embodiment, the NAS security mode command message includes: a UE security capability received by the MME, an integrity algorithm used by the MME, a key identifier, and a seventh NAS-MAC of the NAS security mode command message.

The verification module 1202 is configured to:
  calculate an eighth NAS-MAC of the NAS security mode command message received by the UE; and
  determine whether the eighth NAS-MAC is consistent with the seventh NAS-MAC; and if the eighth NAS-MAC is consistent with the seventh NAS-MAC, determine whether the UE security capability received by the MME is consistent with a UE security capability sent by the UE to the MME.

The first sending module 1203 is configured to: if the UE capability information received by the MME is consistent with the UE capability information sent by the UE to the MME, send the NAS security mode complete message to the MME, where the NAS security mode complete message carries second verification matching information and a NAS-MAC of the NAS security mode complete message.

In the foregoing embodiment, the second verification matching information includes:
  a hash value of an attach request message sent by the UE to the MME; or
  a hash value of the UE capability information sent by the UE to the MME.

In the foregoing embodiment, the second verification matching information includes the UE capability information of the UE.

In the foregoing embodiment, the receiving module 1201 is further configured to: after the first sending module 1203 sends the NAS security mode complete message to the MME, receive a downlink NAS transport message sent by the MME, where the downlink NAS transport message carries a UE capability information request message or a request message for requesting the UE to resend the attach request message.

The first sending module 1203 is further configured to send an uplink information transfer message to the MME, where the uplink information transfer message carries the UE capability information or the attach request message.

In the foregoing embodiment, the receiving module 1201 is further configured to:
  after the first sending module 1203 sends the NAS security mode complete message to the MME, receive a UE information request message sent by the MME, where the UE information request message carries a UE capability information request message or a request message for requesting the UE to resend the attach request message.

The first sending module 1203 is further configured to send a UE information response message to the MME, where the UE information response message carries the UE capability information or the attach request message.

Figure 16:
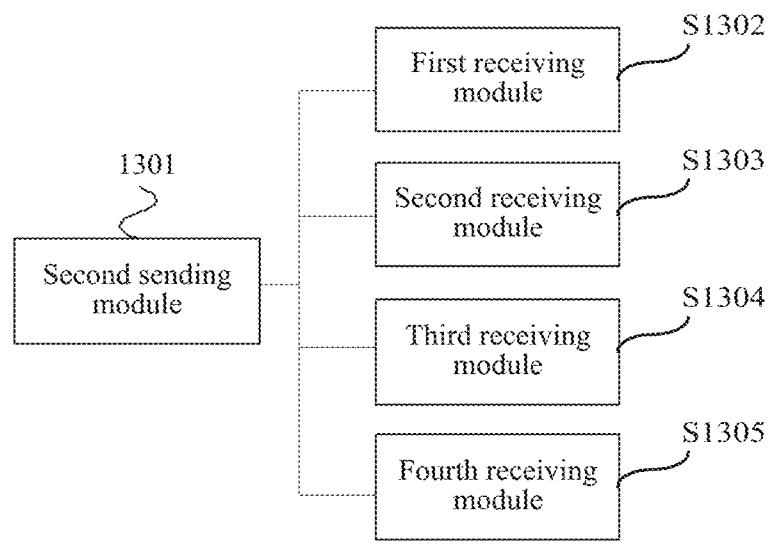
FIG. 16 is a schematic structural diagram of a mobile communications apparatus according to Embodiment 2 of the present disclosure.

FIG. 16 is a schematic structural diagram of a mobile communications apparatus according to Embodiment 2 of the present disclosure. The apparatus is deployed in an MME, and includes:

a second sending module 1301, configured to send a NAS security mode command message to UE, where the NAS security mode command message carries first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

In the foregoing embodiment, the first verification matching information is a first hash value of an attach request message received by the MME, and the NAS security mode command message further includes a Hash algorithm used by the MME to perform Hash calculation on the received attach request message, an integrity algorithm used by the MME, a key identifier, and a first non-access stratum message authentication NAS-MAC of the NAS security mode command message.

In the foregoing embodiment, the NAS security mode command message further includes a UE security capability received by the MME.

As shown in FIG. 16, the apparatus further includes a first receiving module 1302, configured to:
  when a second NAS-MAC of the NAS security mode command generated by the UE is consistent with the first NAS-MAC, a UE security capability sent back by the MME is consistent with a UE security capability sent by the UE to the MME, and a second hash value of the attach request message generated by the UE is inconsistent with the first hash value, receive the NAS security mode complete message sent by the UE, where the NAS security mode complete message carries the attach request message.

In the foregoing embodiment, the first verification matching information is a third hash value of the UE capability information received by the MME, and the NAS security mode command message further includes a Hash algorithm used by the MME to perform Hash calculation on the received UE capability information, an integrity algorithm used by the MME, a key identifier, and a third NAS-MAC of the NAS security mode command message.

In the foregoing embodiment, the NAS security mode command message further includes a UE security capability received by the MME.

As shown in FIG. 16, the apparatus further includes a second receiving module 1303, configured to:
  when a fourth NAS-MAC of the NAS security mode command message generated by the UE is consistent with the third NAS-MAC, a UE security capability sent back by the MME is consistent with a UE security capability sent by the UE to the MME, and a fourth hash value of the UE capability information generated by the UE is inconsistent with the third hash value, receive the NAS security mode complete message sent by the UE, where the NAS security mode complete message carries the UE capability information.

As shown in FIG. 16, the first verification matching information is the UE capability information received by the MME, and the NAS security mode command message further includes an integrity algorithm used by the MME, a key identifier, and a fifth NAS-MAC of the NAS security mode command message.

As shown in FIG. 16, the apparatus further includes a third receiving module 1304, configured to:
when a sixth NAS-MAC of the NAS security mode command message generated by the UE is consistent with the fifth NAS-MAC, a UE security capability included in the UE capability information received by the MME is consistent with a UE security capability sent by the UE to the MME, and the UE determines that capabilities other than the UE security capability in the UE capability information received by the MME are inconsistent with capabilities sent by the UE to the MME, receive the NAS security mode complete message sent by the UE, where the NAS security mode complete message carries the UE capability information.

In the foregoing embodiment, the NAS security mode command message includes: a UE security capability received by the MME, an integrity algorithm used by the MME, a key identifier, and a seventh NAS-MAC of the NAS security mode command message.

In the foregoing embodiment, the apparatus further includes a fourth receiving module 1305, configured to receive the NAS security mode complete message sent by the UE, where the NAS security mode complete message carries second verification matching information and a NAS-MAC of the NAS security mode complete message.

In the foregoing embodiment, the second verification matching information includes:
a hash value of an attach request message sent by the UE to the MME; or
a hash value of the UE capability information sent by the UE to the MME.

In the foregoing embodiment, the second verification matching information includes the UE capability information of the UE.

In the foregoing embodiment, the second sending module 1301 is further configured to: if the UE capability information received by the MME is inconsistent with that sent by the UE, send a downlink NAS transport message to the UE, where the downlink NAS transport message carries a UE capability information request message or a request message for requesting the UE to resend the attach request message.

The fourth receiving module 1305 is further configured to receive an uplink information transfer message sent by the UE, where the uplink information transfer message carries the UE capability information or the attach request message.

In the foregoing embodiment, the second sending module 1301 is further configured to: if the MME determines that the UE capability information received by the MME is inconsistent with that sent by the UE, send a UE information request message to the UE, where the UE information request message carries a UE capability information request message or a request message for requesting the UE to resend the attach request message.

The fourth receiving module 1305 is further configured to receive a UE information response message sent by the UE, where the UE information response message carries the UE capability information or the attach request message.

Figure 17:
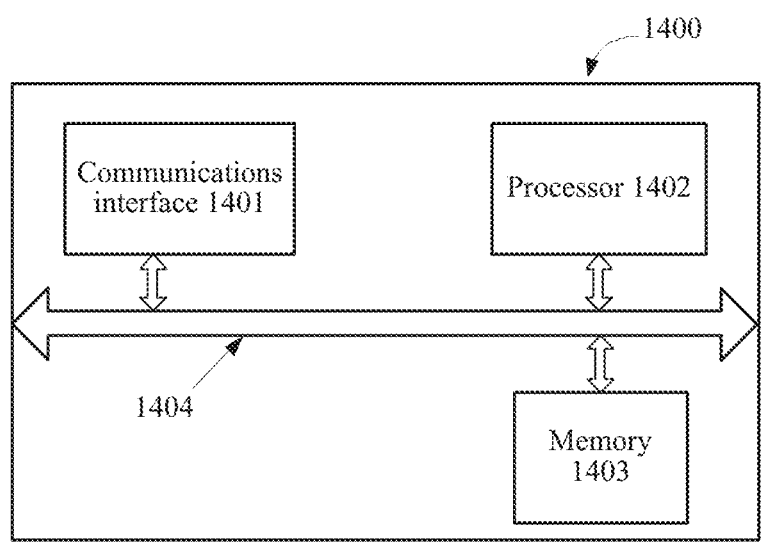
FIG. 17 is a schematic structural diagram of a mobile communications device according to Embodiment 1 of the present disclosure.

FIG. 17 is a schematic structural diagram of a mobile communications device 1400 according to Embodiment 1 of the present disclosure. The mobile communications device 1400 includes a communications interface 1401, a memory 1403, and a processor 1402. The communications interface 1401, the processor 1402, and the memory 1403 are connected to each other by using a bus 1404. The bus 1404 may be a peripheral component interconnect (PCI) bus, an extended industry standard architecture (EISA) bus, or the like. The bus may be classified into an address bus, a data bus, a control bus, or the like. For convenience of representation, only one bold line is used for representation in FIG. 14, but it does not indicate that there is only one bus or one type of bus.

The communications interface 1401 is configured to communicate with a transmit end. The memory 1403 is configured to store a program. The program may include program code, and the program code includes a computer operation instruction. The memory 1403 may include a random access memory (RAM), or may further include a non-volatile memory, such as at least one magnetic disk storage.

The processor 1402 executes the program stored in the memory 1403 to implement the method in the foregoing method embodiments of the present disclosure:
receiving a non-access stratum NAS security mode command message from a mobility management entity MME, where the NAS security mode command message carries first verification matching information used to verify UE capability information received by the MME;
determining, based on the first verification matching information, whether the UE capability information received by the MME is consistent with UE capability information sent by the UE to the MME; and
if the UE capability information received by the MME is consistent with the UE capability information sent by the UE to the MME, sending a NAS security mode complete message to the MME.

The processor 1402 may be a general-purpose processor, including a central processing unit (CPU), a network processor (NP), and the like; or may be a digital signal processor (DSP), an application-specific integrated circuit (ASIC), a field programmable gate array (FPGA), or another programmable logical device, discrete gate or transistor logical device, or discrete hardware component.

Figure 18:
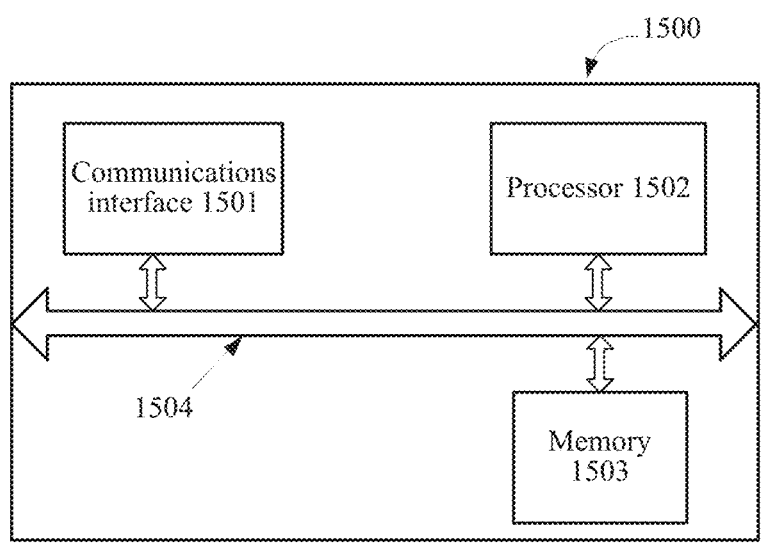
FIG. 18 is a schematic structural diagram of a mobile communications device according to Embodiment 2 of the present disclosure.

FIG. 18 is a schematic structural diagram of a mobile communications device 1500 according to Embodiment 2 of the present disclosure. The mobile communications device 1500 includes a communications interface 1501, a memory 1503, and a processor 1502. The communications interface 1501, the processor 1502, and the memory 1503 are connected to each other by using a bus 1504. The bus 1504 may be a peripheral component interconnect bus, an EISA bus, or the like. The bus may be classified into an address bus, a data bus, a control bus, or the like. For convenience of representation, only one bold line is used for representation in FIG. 15, but it does not indicate that there is only one bus or one type of bus.

The communications interface 1501 is configured to communicate with a transmit end. The memory 1503 is configured to store a program. Specifically, the program may include program code, and the program code includes a computer operation instruction. The memory 1503 may include a random access memory RAM, or may further include a non-volatile memory, such as at least one magnetic disk storage.

The processor 1502 executes the program stored in the memory 1503 to implement the method in the foregoing method embodiments of the present disclosure:
determining first verification matching information used by UE to verify UE capability information received by the MME; and sending a NAS security mode command message to the UE, where the NAS security mode command message carries the first verification matching information, so that the UE determines, based on the first verification matching information, whether UE capability information received by the MME is consistent with UE capability information sent by the UE to the MME; and if the UE capability information received by the MME is consistent with the UE capability information sent by the UE to the MME, the UE sends a NAS security mode complete message to the MME.

The processor 1502 may be a general-purpose processor, including a central processing unit (CPU), a network processor (NP), and the like; or may be a digital signal processor (DSP), an application-specific integrated circuit (ASIC), a field programmable gate array (FPGA), or another programmable logical device, discrete gate or transistor logical device, or discrete hardware component.

According to the mobile communications device of this embodiment of the present disclosure, the UE verifies, based on the received first verification matching message, whether the UE capability information received by the MME is consistent with the UE capability information sent by the UE to the MME. It can be learned that, in the embodiments of the present disclosure, the MME sends back the verification matching message, and the UE verifies the UE capability information received by the MME, to ensure that the MME possesses correct UE capability information. This resolves a DoS attack problem caused by that in an attach procedure, an attach request message is not protected by a NAS security context, an attacker may modify the UE capability information, and the MME cannot obtain a correct UE capability. DoS is an abbreviation of Denial of Service, that is, denial of service, and an attack behavior causing the DoS is referred to as a DoS attack.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that, the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A mobile communication method, comprising:
   receiving a non-access stratum (NAS) security mode command message from a mobility management entity, wherein the NAS security mode command message carries a second user equipment (UE) security capability sent back by the mobility management entity;
   verifying integrity of the NAS security mode command message and whether the second UE security capability is consistent with a first UE security capability sent to the mobility management entity; and
   after successfully verifying both the integrity of the NAS security mode command message and the second UE security capability is consistent with the first UE security capability, sending UE capability information of a UE in a security protected NAS message to the mobility management entity, wherein the UE capability information indicates a service that the UE is capable of using.

2. The method according to claim 1, wherein the UE capability information comprises the first UE security capability and a capability other than the first UE security capability, and wherein the capability other than the first UE security capability indicates the service that the UE is capable of using.

3. The method according to claim 2, wherein the service is a voice call service.

4. The method according to claim 3, wherein the UE capability information indicating whether the UE is capable of using the voice call service is a voice domain preference and UE's usage setting.

5. The method according to claim 4, wherein the NAS security mode command message further comprises an integrity algorithm used by the mobility management entity and a key identifier.

6. The method according to claim 1, wherein the NAS security mode command message further comprises a first non-access stratum message authentication code (NAS-MAC) of the NAS security mode command message, and the verifying integrity of the NAS security mode command message comprises:
   calculating a second NAS-MAC of the NAS security mode command message; and
   determining whether the second NAS-MAC is consistent with the first NAS-MAC.

7. The method according to claim 1, wherein the security protected NAS message is a NAS security mode complete message, wherein the NAS security mode complete message comprises a NAS-MAC of the NAS security mode complete message for performing security protection on the NAS security mode complete message.

8. The method according to claim 1, wherein the sending the UE capability information comprises:
   sending the UE capability information in response to a request from the mobility management entity.

9. The method according to claim 1, further comprising:
   sending, to the mobility management entity, a message for registering with a network for a first time, wherein the message for registering with the network comprises the first UE security capability, wherein the message for registering with the network is unprotected by a NAS security context.

10. The method according to claim 9, wherein the message for registering with the network is an attach request message.

11. The method according to claim 1, wherein the method is implemented by an apparatus deployed in the UE.

12. An apparatus, comprising:
   at least one processor coupled to a memory storing programming instructions for execution by the at least one processor to cause the apparatus to:
      receive a non-access stratum (NAS) security mode command message from a mobility management entity, wherein the NAS security mode command message carries a second user equipment (UE) security capability sent back by the mobility management entity;
      verify integrity the NAS security mode command message and whether the second UE security capability is consistent with a first UE security capability sent to the mobility management entity; and after successfully verifying both the integrity of the NAS security mode command message and the second UE security capability is consistent with the first UE security capability, send UE capability information of a UE in a security protected NAS message to the mobility management entity, wherein the UE capability information indicates a service that the UE is capable of using.

13. The apparatus according to claim 12, wherein the UE capability information comprises the first UE security capability and a capability other than the first UE security capability, and wherein the capability other than the first UE security capability indicates the service that the UE is capable of using.

14. The apparatus according to claim 13, wherein the service is a voice call service.

15. The apparatus according to claim 14, wherein the UE capability information indicating whether the UE is capable of using the voice call service is a voice domain preference and UE's usage setting.

16. The apparatus according to claim 12, wherein the NAS security mode command message further comprises a first non-access stratum message authentication code (NAS-MAC) of the NAS security mode command message, and wherein the programming instructions are for execution by the at least one processor to cause the apparatus to verify the integrity of the NAS security mode command message by:

calculating a second NAS-MAC of the NAS security mode command message; and determining whether the second NAS-MAC is consistent with the first NAS-MAC.

17. The apparatus according to claim 12, wherein the security protected NAS message is a NAS security mode complete message, wherein the NAS security mode complete message comprises a NAS-MAC of the NAS security mode complete message for performing security protection on the NAS security mode complete message.

18. The apparatus according to claim 12, wherein the programming instructions are for execution by the at least one processor to cause the apparatus to send the UE capability information by:

sending the UE capability information in response to a request from the mobility management entity.

19. The apparatus according to claim 12, wherein the programming instructions are for execution by the at least one processor to cause the apparatus to:

send, to the mobility management entity, a message for registering with a network for a first time, wherein the message for registering with the network comprises the first UE security capability, wherein the message for registering with the network is unprotected by a NAS security context.

20. The apparatus according to claim 12, wherein the apparatus is deployed in the UE.

* * * * *